(12) United States Patent
Torii

(10) Patent No.: US 10,719,841 B2
(45) Date of Patent: Jul. 21, 2020

(54) AFFILIATE REWARD DIVIDING APPARATUS, AFFILIATE REWARD DIVIDING SYSTEM, AFFILIATE REWARD DIVIDING METHOD, AFFILIATE REWARD DIVIDING PROGRAM, AND COMPUTER-READABLE RECORDING MEDIUM

(75) Inventor: Atsushi Torii, Shinagawa-ku (JP)

(73) Assignee: RAKUTEN, INC., Tokyo (JP)

( * ) Notice: Subject to any disclaimer, the term of this patent is extended or adjusted under 35 U.S.C. 154(b) by 300 days.

(21) Appl. No.: 13/382,249

(22) PCT Filed: Jul. 9, 2010

(86) PCT No.: PCT/JP2010/061663
§ 371 (c)(1),
(2), (4) Date: Jan. 4, 2012

(87) PCT Pub. No.: WO2011/007721
PCT Pub. Date: Jan. 20, 2011

(65) Prior Publication Data
US 2012/0109725 A1 May 3, 2012

(30) Foreign Application Priority Data
Jul. 14, 2009 (JP) ................. 2009-166038

(51) Int. Cl.
*G06Q 30/00* (2012.01)
*G06Q 30/02* (2012.01)
(Continued)

(52) U.S. Cl.
CPC ..... *G06Q 30/0214* (2013.01); *G06Q 30/0207* (2013.01); *G06Q 10/067* (2013.01);
(Continued)

(58) Field of Classification Search
CPC .......... G06Q 30/0255; G06Q 30/0235; G06Q 10/105; G06Q 10/103; G06Q 10/067;
(Continued)

(56) References Cited

U.S. PATENT DOCUMENTS 6,405,175 B1 * 6/2002 Ng ............................. 705/14.26
6,618,706 B1 9/2003 Rive et al.
(Continued)

FOREIGN PATENT DOCUMENTS

JP 2007-219860 A 8/2007
KR 10-2002-0039600 A 5/2002
(Continued)

OTHER PUBLICATIONS

Uncles et al., Customer Loyalty and Customer Loyalty Programs: Journal of Consumer Marketing, Jul. 1, 2003, vol. 20 No. 4, pp. 294-316. (Year: 2003).*

(Continued)

*Primary Examiner* — Patricia H Munson
*Assistant Examiner* — Uche Byrd
(74) *Attorney, Agent, or Firm* — Xsensus LLP

(57) ABSTRACT

A problem that a load on an affiliate server increases when an affiliate reward is divided among a plurality of people is solved. When a user purchases a commodity or receives service in an EC site, an affiliate reward dividing apparatus adds a full amount of a reward to one of a poster database and an introducer database on the basis of a dividing ratio stored in an affiliate database. A computation of referring to a dividing ratio for each reward and dividing a reward, and a process of accumulating a divided reward in each data base is not necessary, so that a load on a system can be lessened.

14 Claims, 19 Drawing Sheets

(51) Int. Cl.
  *G06Q 40/00* (2012.01)
  *G06Q 10/10* (2012.01)
  *G06Q 30/06* (2012.01)
  *G06Q 10/06* (2012.01)

(52) U.S. Cl.
  CPC ..... *G06Q 10/06315* (2013.01); *G06Q 10/103* (2013.01); *G06Q 10/105* (2013.01); *G06Q 30/00* (2013.01); *G06Q 30/02* (2013.01); *G06Q 30/0255* (2013.01); *G06Q 30/06* (2013.01); *G06Q 40/00* (2013.01)

(58) Field of Classification Search
  CPC .. G06Q 30/02; G06Q 10/06315; G06Q 40/00; G06Q 30/00; G06Q 30/06; H04Q 7/20
  USPC ................................................ 705/7.11–7.42
  See application file for complete search history.

(56) References Cited

U.S. PATENT DOCUMENTS

| | | | |
|---|---|---|---|
| 7,774,229 B1* | 8/2010 | Dernehl | G06Q 30/02 705/14.1 |
| 8,407,087 B2* | 3/2013 | Postrel | G06Q 30/02 235/380 |
| 2002/0059130 A1 | 5/2002 | Cheng et al. | |
| 2005/0027626 A1* | 2/2005 | Garcia | G06Q 40/00 705/35 |
| 2006/0218024 A1* | 9/2006 | Lulla | 705/5 |
| 2007/0219860 A1* | 9/2007 | Karls | 705/14 |
| 2007/0220575 A1* | 9/2007 | Cooper et al. | 725/118 |
| 2007/0288312 A1* | 12/2007 | Wang | G06Q 30/0214 705/14.16 |
| 2008/0155588 A1 | 6/2008 | Roberts et al. | |
| 2008/0210753 A1* | 9/2008 | Plozay | G06Q 30/02 235/380 |
| 2009/0164275 A1* | 6/2009 | Chen et al. | 705/7 |
| 2009/0276305 A1* | 11/2009 | Clopp | G06Q 30/00 705/14.16 |
| 2010/0088184 A1 | 4/2010 | Nagai | |
| 2012/0109344 A1* | 5/2012 | Kelly | G07F 17/3267 700/91 |
| 2012/0232999 A1* | 9/2012 | Roberts | G06Q 30/00 705/14.66 |

FOREIGN PATENT DOCUMENTS

| | | |
|---|---|---|
| TW | 200912780 A | 3/2009 |
| WO | 02/42970 A1 | 5/2002 |
| WO | 2006/100179 A2 | 9/2006 |
| WO | 2007/103700 A2 | 9/2007 |
| WO | 2008/111415 A1 | 9/2008 |

OTHER PUBLICATIONS

Katsuki Fujisawa et al., "A Challenge to Large Scale Optimization Problem", IPSJ Magaizine, Apr. 15, 2004, pp. 372-376, vol. 45, No. 4.

Korean Office Action dated Sep. 6, 2013, issued in Korean Patent Application No. 10-2011-7031046.

European Search Report dated Dec. 17, 2012, issued in Corresponding European Patent Application No. 10799799.3.

Wen-Syan Li et al., Load balancing and data placement for multi-tiered database systems; Data & Knowledge Engineering; www.lelsevier.com/datak;www.sciencedirect.com; vol. 62, 2007, pp. 523-546.

English translation of extract of Office Action in Taiwanese Patent Application No. 099122829 dated Feb. 18, 2014.

* cited by examiner

FIG.5
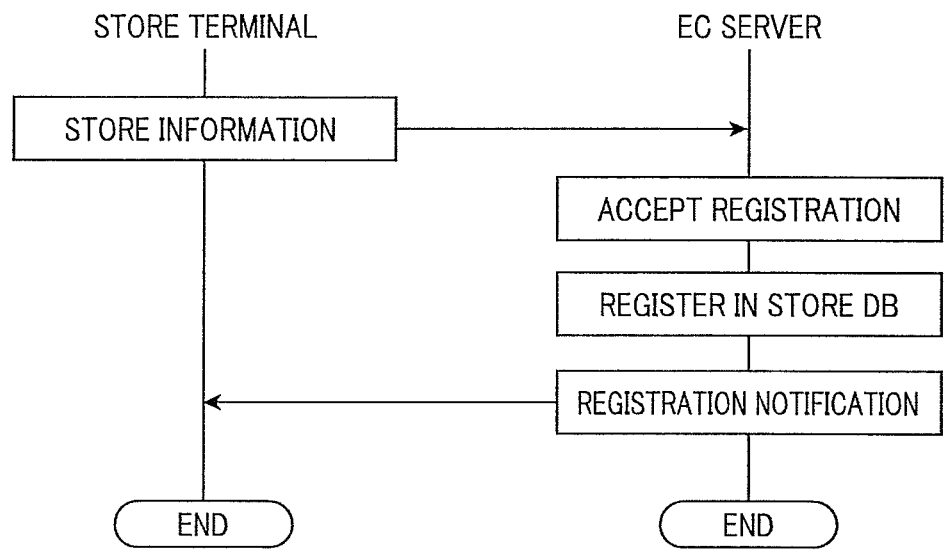
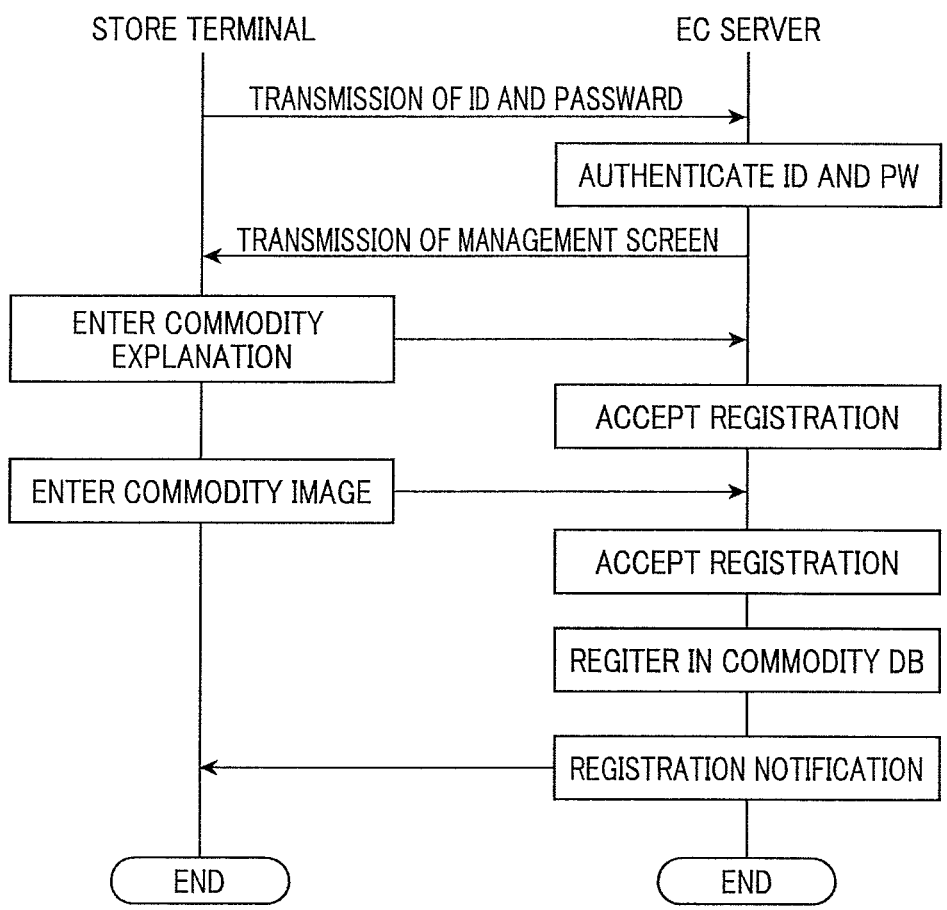

| REWARD | 15,000YEN × 0.01 |
|---|---|
| TYPE | POINTS |
| DIVISION FLAG | ONLY POSTER |
| DIVIDING RATIO | 100% FOR POSTER |
| DIVIDING METHOD | |
| AFFILIATOR ID (POSTER ID) | P123456 |
| AFFILIATOR ID (INTRODUCER ID) | |

(EXAMPLE 1)

| REWARD | 15,000YEN ×0.01 |
|---|---|
| TYPE | POINTS |
| DIVISION FLAG | POSTER & INTRODUCER |
| DIVIDING RATIO | 50% : 50% |
| DIVIDING METHOD | ALTERNATE |
| AFFILIATOR ID (POSTER ID) | P123456 |
| AFFILIATOR ID (INTRODUCER ID) | A987654 |

(EXAMPLE 2)

| REWARD | 15,000YEN ×0.01 |
|---|---|
| TYPE | POINTS |
| DIVISION FLAG | POSTER & INTRODUCER |
| DIVIDING RATIO | 80% : 20% |
| DIVIDING METHOD | COUNT 0 TO 7 FOR P, COUNT 8 to 9 FOR A |
| AFFILIATOR ID (POSTER ID) | P123456 |
| AFFILIATOR ID (INTRODUCER ID) | A987654 |

AFFILIATE REWARD DIVIDING APPARATUS, AFFILIATE REWARD DIVIDING SYSTEM, AFFILIATE REWARD DIVIDING METHOD, AFFILIATE REWARD DIVIDING PROGRAM, AND COMPUTER-READABLE RECORDING MEDIUM

CROSS REFERENCE TO RELATED APPLICATIONS

This application is a National Stage of International Application No. PCT/JP2010/061663 filed Jul. 9, 2010, claiming priority based on Japanese Patent Application No. 2009-166038 filed Jul. 14, 2009, the contents of all of which are incorporated herein by reference in their entirety.

TECHNICAL FIELD

The present invention relates to an affiliate reward dividing apparatus, an affiliate reward dividing system, an affiliate reward dividing method, an affiliate reward dividing program, and a computer-readable recording medium. More particularly, the invention relates to an affiliate reward dividing apparatus, an affiliate reward dividing system, an affiliate reward dividing method, an affiliate reward dividing program, and a computer-readable recording medium for dividing a reward between a content manager and an introduction page manager, not only in the case where a process of purchasing a commodity or the like is performed in an EC (Electronic Commerce) site via content explaining service or a commodity, but also in the case where a process of purchasing a commodity or the like is performed in an EC site via an introduction page (affiliate site) of a third party who introduces the content.

BACKGROUND ART

An affiliate system employs a mechanism of, when a commodity or the like in an EC site is purchased via content explaining service or a commodity provided by an affiliate site, giving a reward such as points from a manager of the EC site to a manager of the content and the manager of the affiliate site.

Patent Document No. 1 discloses an affiliate system in which when a commodity or the like in an EC site is purchased via content provided by an affiliate site, a reward is paid from the EC site to the affiliate site. The affiliate system distributes video image content as a screen saver which is reproduced in a user terminal. When a user purchases a commodity or the like in the EC site via the video image content which is being reproduced, a part of the affiliate reward is distributed to a producer of the video image content.

PRIOR ART DOCUMENT

Patent Document

Patent Document No. 1: Japanese Patent Application Laid-Open No. 2007-219860

SUMMARY OF THE INVENTION

Problems to be Solved by the Invention

The affiliate system in the publication is directed to divide a reward between an introduction page (affiliate site) and a content manager (video image content producer) and has the following problem.

A reward to be paid to the introduction page manager and a reward to be paid to the content manager are calculated on the basis of a reward dividing rule of dividing an affiliate reward. However, the concrete calculation rule is unknown. Even if a reward is divided by determining a ratio, when a predetermined amount (or a value such as points) is divided on the basis of the ratio, a process of dividing a reward between the introduction page manager and the content manager is necessary in the system each time a commodity or the like is purchased in the EC site. When a commodity is purchased rarely in the EC site, it is unnecessary to worry about the system load. However, when commercial transactions via the introduction page increase, accumulation of the dividing process becomes unignorable, and load on the server increases.

An object of the present invention is to provide an affiliate reward dividing apparatus, an affiliate reward dividing system, an affiliate reward dividing method, an affiliate reward dividing program, and a computer-readable recording medium realizing lessening of a load on a server by an affiliate reward dividing process in an affiliate reward dividing system for dividing a reward between a content manager and an introduction page manager who introduces content in the case where a process of purchasing a commodity or the like is performed in an EC site via an introduction page of a third party who introduces content of explaining service or a commodity.

Means for Solving the Problems

An affiliate reward dividing apparatus according to the invention is an affiliate reward dividing apparatus for dividing a reward between a content manager who manages content of explaining service or a commodity and an introduction page manager who introduces the content, comprising:

an affiliate database that stores an affiliate program for guiding a user from an introduction page for introducing the content to an EC site which deals service or a commodity of the content, an amount of a reward, and a dividing ratio of the reward between the content manager and the introduction page manager; and a controller, when the user purchases a commodity or receives service in the EC site via the affiliate program in the introduction page, that receives use data from the EC site, refers to the affiliate database, and divides the amount of the reward and adds the resultant amount to a content manager database storing information of the content manager or an introducer database storing information of the introduction page manager, wherein when the user purchases a commodity or receives service in the EC site, the controller determines one of the content manager database and the introducer database, and adds the full amount of the reward to the determined database, on the basis of the dividing ratio stored in the affiliate database.

An affiliate reward dividing system according to the invention is an affiliate reward dividing system for dividing a reward between a content manager who manages content of explaining service or a commodity and an introduction page manager who introduces the content, comprising:

a content database that receives and stores content data of a commodity or service from a content management terminal device for managing the content;

a content manager database that stores information of a content manager;

an introducer database that stores information of an introduction page manager;

an affiliate database that stores an affiliate program for guiding a user from an introduction page for introducing the content to an EC site which deals with service or a commodity of the content, an amount of a reward, and a dividing ratio of the reward between the content manager and the introduction page manager; and an affiliate reward dividing apparatus, when the user purchases a commodity or receives service in the EC site via the affiliate program in the introduction page, that receives use data from the EC site, refers to the affiliate database, and divides the amount of the reward and adds the resultant amount to the content manager database or the introducer database, wherein when the user purchases a commodity or receives service in the EC site, the affiliate reward dividing apparatus determines one of the content manager database and the introducer database, and adds a full amount of the reward to the determined database, on the basis of the dividing ratio stored in the affiliate database.

An affiliate reward dividing method according to the invention is an affiliate reward dividing method for dividing a reward between a content manager who manages content of explaining service or a commodity and an introduction page manager who introduces the content, comprising:

a first step of storing an affiliate program for guiding a user from an introduction page for introducing the content to an EC site which deals with service or a commodity of the content, an amount of a reward, and a dividing ratio of the reward between the content manager and the introduction page manager, in an affiliate database; and a second step, when the user purchases a commodity or receives service in the EC site via the affiliate program in the introduction page, of receiving use data from the EC site, referring to the affiliate database, dividing the amount of the reward between a content manager database that stores information of the content manager and an introducer database that stores information of the introduction page manager, and adding the resultant amount to the content manager database or the introducer database, wherein in the second step, when the user purchases a commodity or receives service in the EC site, one of the content manager database and the introducer database is determined and a full amount of the reward is added to the determined database on the basis of the dividing ratio stored in the affiliate database.

An affiliate reward dividing program according to the invention is a program for making a computer execute an affiliate reward dividing method for dividing a reward between a content manager who manages content of explaining service or a commodity and an introduction page manager who introduces the content, comprising:

a first step of storing an affiliate program for guiding a user from an introduction page for introducing the content to an EC site which deals with service or a commodity of the content, an amount of a reward, and a dividing ratio of the reward between the content manager and the introduction page manager, in an affiliate database; and a second step, when the user purchases a commodity or receives service in the EC site via the affiliate program in the introduction page, of receiving use data from the EC site, referring to the affiliate database, dividing the amount of the reward between a content manager database that stores information of the content manager and an introducer database that stores information of the introduction page manager, and adding the resultant amount to the content manager database or the introducer database, wherein in the second step, when the user purchases a commodity or receives service in the EC site, one of the content manager database and the introducer database is determined, and a full amount of the reward is added to the determined database on the basis of the dividing ratio stored in the affiliate database.

A computer-readable recording medium according to the invention is a computer-readable recording medium that records a program for making a computer execute an affiliate reward dividing method for dividing a reward between a content manager who manages content of explaining service or a commodity and an introduction page manager who introduces the content, the program comprising:

a first step of storing an affiliate program for guiding a user from an introduction page for introducing the content to an EC site which deals with service or a commodity of the content, an amount of a reward, and a dividing ratio of the reward between the content manager and the introduction page manager, in an affiliate database; and a second step, when the user purchases a commodity or receives service in the EC site via the affiliate program in the introduction page, of receiving use data from the EC site, referring to the affiliate database, dividing the amount of the reward between a content manager database that stores information of the content manager and an introducer database that stores information of the introduction page manager, and adding the resultant amount to the content manager database or the introducer database, wherein in the second step, when the user purchases a commodity or receives service in the EC site, one of the content manager database and the introducer database is determined, and a full amount of the reward is added to the determined database, on the basis of the dividing ratio stored in the affiliate database.

An affiliate reward dividing system according to the invention is an affiliate reward dividing system for dividing a reward between a commodity explanation page manager and an introduction page manager who introduces a commodity explanation page, comprising:

a commodity or service explanation database that receives and stores posted data of a commodity or service from a terminal device of the explanation page manager;

a poster database that stores information of a commodity or service explanation page manager;

an introducer database that stores information of the introduction page manager;

an affiliate database that stores an affiliate program provided to a terminal device of the introduction page manager, an amount of a reward, a dividing ratio of the reward between the explanation page manager and the introduction page manager, and a method of dividing the reward;

an affiliate tool providing apparatus, when there is a request from the terminal device of the introduction page manager, that transmits an explanation data link for providing the commodity explanation data from the commodity explanation database and an affiliate link having an affiliate program to be pasted to the introduction page, to the terminal device; and an affiliate reward dividing apparatus, when the user purchases a commodity or receives service in the EC site via the affiliate link in the introduction page, that receives use data from the EC site, refers to the affiliate database, divides the amount of the reward between the poster database and the introducer database, and adds the resultant amount to the poster database or the introducer database, wherein the affiliate reward dividing apparatus adds the reward amount data to one of the poster database and the introducer database in accordance with a dividing ratio and a dividing method stored in the affiliate database.

Effects of the Invention

According to the present invention, when a user purchases a commodity or receives service on an EC site, on the basis of a dividing ratio stored in an affiliate database, either a content manager database or an introducer database is determined and a full amount of a reward is added to the determined database.

It makes computation of dividing a reward with reference to a dividing ratio for each reward and a process of accumulating a divided reward in each of databases unnecessary, and the load on the system can be lessened.

Further, according to the present invention, when a reward is created, the reward is successively, concentratedly added to one of the explanation page manager and the introduction page manager. There is consequently also an effect that an increase becomes noticeable and the reward becomes impressive.

BRIEF DESCRIPTION OF THE DRAWINGS

FIG. 5 is a diagram showing a flow of process on store information registered in the store database, and a flow of process on commodity explanation information and commodity image information registered in the commodity database.

MODE FOR CARRYING OUT THE INVENTION

Best modes for carrying out the present invention will be described in detail with reference to the drawings.

Embodiments described below are based on the premise that the present invention is applied to a shopping system in which the user can purchase a commodity via a network by using a terminal device (so-called net shopping). The invention can be used not only for purchasing a commodity but also for using services.

The embodiments as best modes described below are based on the case a posted object is a moving picture for explaining a commodity. The case of posting a commodity explanation and a service explanation in place of a moving picture and the case of posting a commodity explanation and a service explanation together with a moving picture are also included in the scope of the invention.

Figure 1:
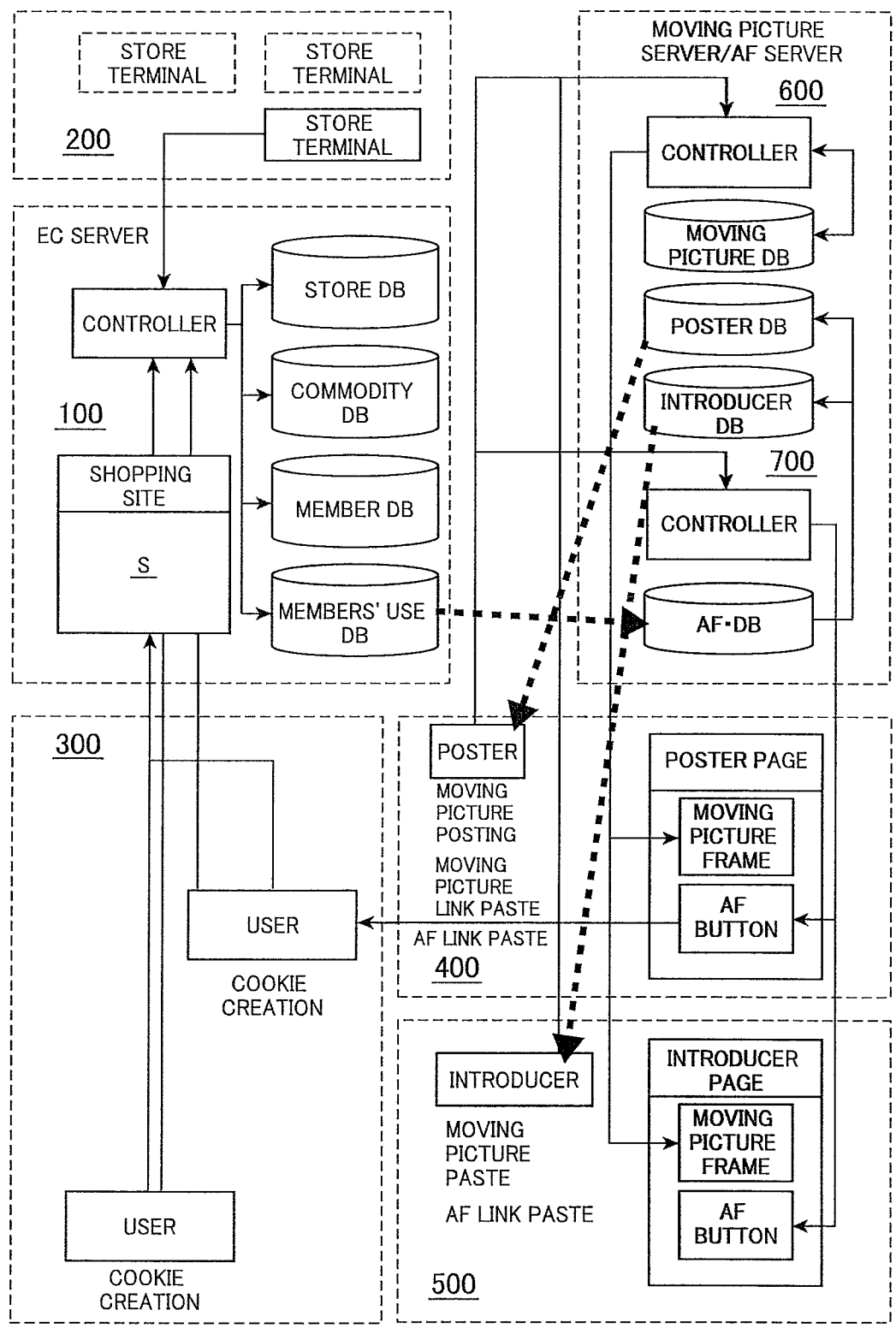
FIG. 1 is a diagram showing an outline of a network used by an affiliate reward dividing system according to the present invention.

FIG. 1 is a block diagram showing an outline of a network used by an affiliate reward dividing system according to the present invention.

A network environment used by the affiliate reward dividing system of the invention includes (1) an EC server 100 managing and providing a net shopping site S, (2) a store terminal 200 (210, 220, 230) of a store opened in the net shopping site S, (3) a user terminal 300 (310, 320) of a user purchasing a commodity in the net shopping site S, (4) a poster terminal 400 for generating commodity explanation data on a commodity in the net shopping site S, posting the data, and disclosing the data on a page of itself, (5) an introducer terminal 500 for accessing the commodity explanation data in a page managed by the poster, drawing the commodity explanation data, and disclosing it on a page of itself, (6) a moving picture server 600 for managing a poster (an example of a content manager), an introducer, and moving picture data explaining service or a commodity (an example of content), and (7) an affiliate server 700 providing a poster and an introducer with an affiliate link and an affiliate program, computing a reward on the basis commodity purchase history of the user, and giving rewards to the poster and/or the introducer. The affiliate program guides the user from an introduction page of introducing content to the EC site dealing with service or commodities of the content.

The EC server 100, the store terminal 200, the user terminal 300, the poster terminal 400, the introducer terminal 500, the moving picture server 600, and the affiliate server 700 can transmit/receive data to/from one another via network using, for example, TCP/IP (Transmission Control Protocol/Internet Protocol) as a communication protocol. The network is constructed by, for example, the Internet, a dedicated communication line (for example, a CATV (Community Antenna Television) line), a mobile communication network (including a base station), a gateway, or the like.

A preferable use mode of the affiliate reward dividing system of the present invention is characterized in that when the user purchases a commodity by the EC server 100 via an affiliate link in an introducer page, a reward is divided to a poster database (an example of a content manager database) and an introducer database by a predetermined dividing method.

Figure 2:
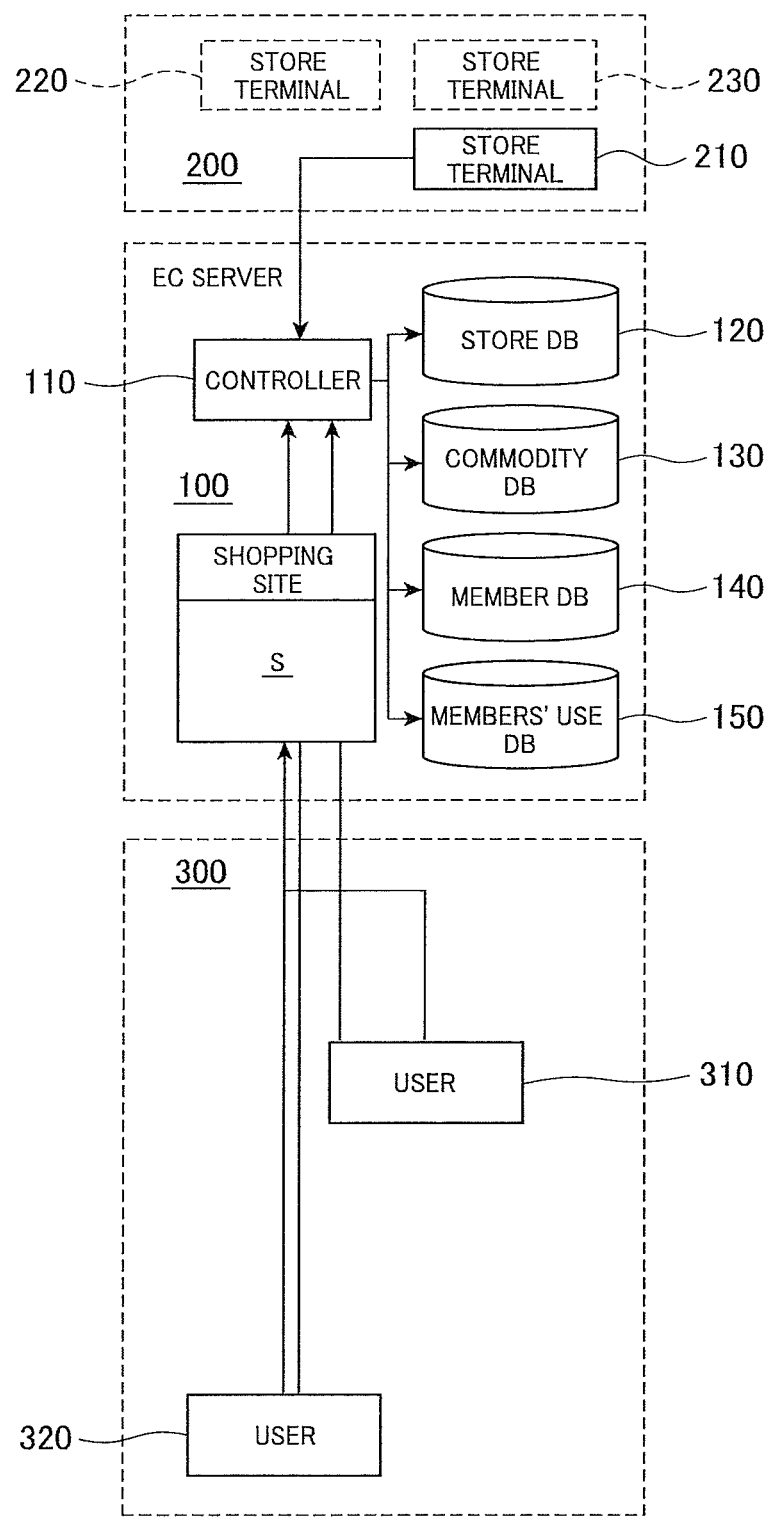
FIG. 2 is a block diagram for explaining processes performed among an EC server 100, a store terminal 200, and a user terminal 300.

FIG. 2 is a block diagram for explaining processes performed among the EC server 100, the store terminal 200, and the user terminal 300.

A person in charge in a store stores store information and commodity information in the EC server 100 via the store terminal 210 (220, 230, . . . ). Under control of a system control unit 110, the EC server 100 stores the store information into a store database 120 and stores the commodity information into a commodity database 130 in accordance with an operation on the store terminal 210.

The person in charge in the store can register an affiliate store or an affiliate commodity by taking a predetermined procedure in the EC server 100.

The users store member information in the EC server 100 via the user terminals 310 and 320. The EC server 100 stores the member information in a member database 140 in accordance with operations on the user terminals 310 and 320 under control of the system control unit 110. The users can purchase commodities in the net shopping site S via the user terminals 310 and 320.

The embodiment is based on the premise that cookies are enabled in the browsers of the user terminals 310 and 320.

Figure 3:
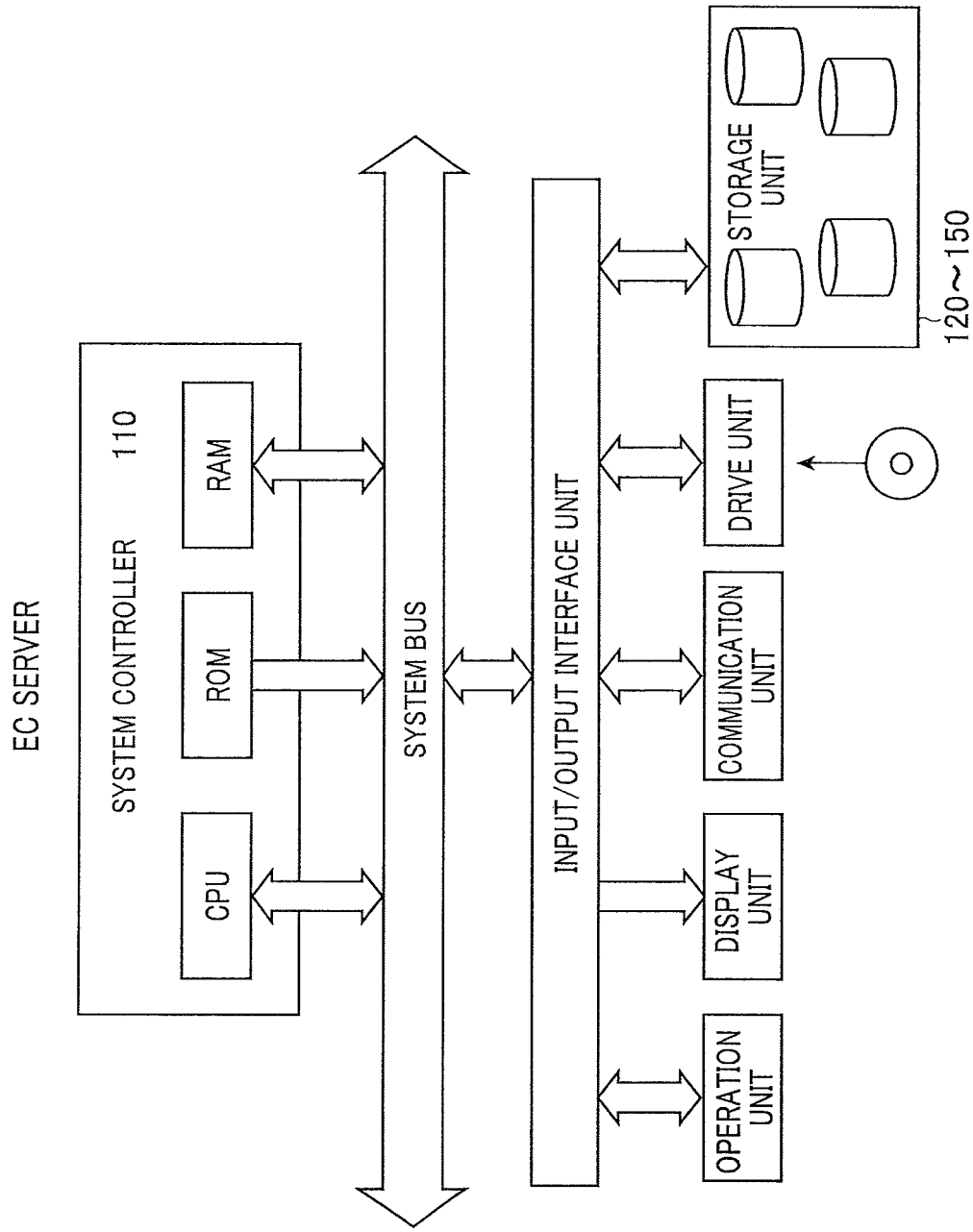
FIG. 3 is a block diagram showing an example of components of the EC server.

FIG. 3 is a block diagram showing an example of components of the EC server 100. The EC server 100 has an operation unit, a display unit (for example, a CRT (Cathode Ray Tube) display, a liquid crystal display, or the like), a communication unit, a drive unit, a storage unit, an input/output interface unit, and the system control unit 110. The system control unit 110 and the input/output interface unit are connected to each other via a system bus.

The operation unit includes, for example, a keyboard and a mouse, receives an operation instruction from an operator or the like, and outputs it as an instruction signal to the system control unit 110. The display unit is, for example, a CRT (Cathode Ray Tube) display, a liquid crystal display, or the like and displays information of characters, images, and the like. The communication unit is connected to a network NW and controls a communication state with the store terminal 200 and the user terminal 300. The drive unit, for example, reads data or the like from a disk such as a flexible disk, a CD (Compact Disc) or a DVD (Digital Versatile Disc), and records data on the disk. The storage unit is, for example, a hard disk drive or the like, stores various programs, data, and the like. The storage unit is an example of image data storing means. The input/output interface unit performs a process of interface between the operation unit, the display unit, the communication unit, the drive unit, and the storage unit and the system control unit 110. The system control unit 110 includes a CPU (Central Processing Unit), a ROM (Read Only Memory), and a RAM (Random Access Memory).

In the storage unit, the store information database 120, the commodity information database 130, the member information database 140, and a members' use-history database 150 are created.

Figure 4:
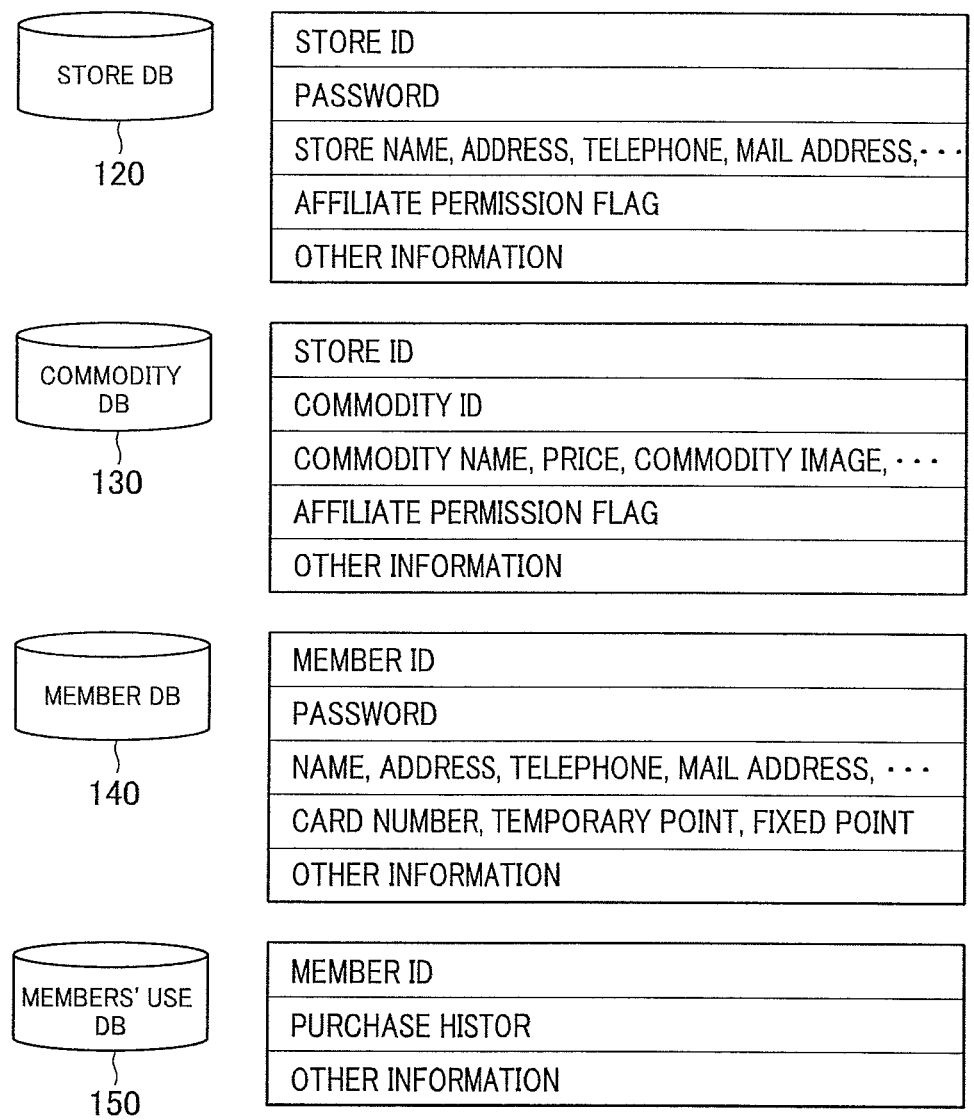
FIG. 4 is a diagram showing an example of the details of information registered in a store database, a commodity database, a member database, and a members' use database.

FIG. 4 is a diagram showing an example of the details of information registered in the databases in the storage unit.

In the store information database 120, information on a store and an affiliate permission flag are stored. The affiliate permission flag is information indicating whether the store permits an affiliate advertisement of an external site.

In the commodity information database 130, information on a commodity and an affiliate permission flag are stored in association with a store ID. The affiliate permission flag is information indicating whether the commodity permits an affiliate advertisement of an external site.

In the member database 140, personal information on a member is stored.

In the members' use database 150, information of a purchase history and the like is stored in association with the member ID.

FIG. 5 is a diagram showing a flow of process on store information registered in the store database, and a flow of process on commodity explanation information and commodity image information registered in the commodity database.

When a person in charge in a store operates the store terminal 210 to access the EC server 100 and enter information such as the store name and address, the EC server 100 stores the store name and the like into the store information database 120.

When a person in charge in a store operates the store terminal 210 to access the EC server 100, after authentication, enter commodity explanation, and transmits a commodity image, the EC server 100 stores the commodity explanation information (for example, a text) and a commodity image (for example, a GIF image) in the commodity database 130.

Figure 6:
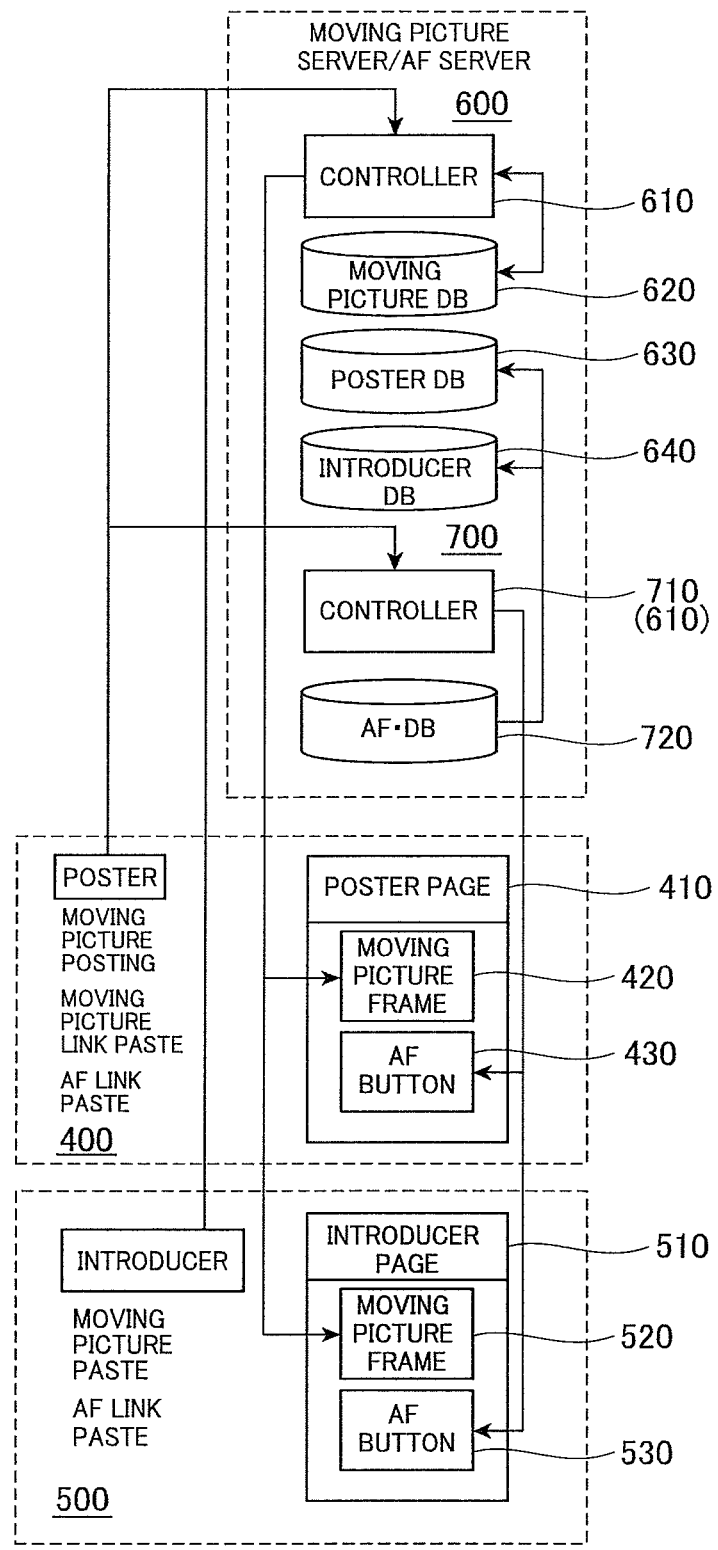
FIG. 6 is a block diagram for explaining processes performed among a poster terminal 400, an introducer terminal 500, a moving picture server 600, and an affiliate server 700.

FIG. 6 is a block diagram for explaining processes performed among the poster terminal 400, the introducer terminal 500, the moving picture server 600, and the affiliate server 700.

The poster views the commodity explanation information and the commodity image in the net shopping site S of the EC server 100, creates a commodity explanation moving picture, introduces the commodity in a poster page 410 of the poster himself/herself, and provides the commodity explanation moving picture in a form which can be used by a third party. The poster establishes an affiliate link 430 in the poster page 410 so as to be adjacent to a frame 420 of the commodity explanation moving picture or so as to be superimposed on the frame of the commodity explanation moving picture.

The introducer views the commodity explanation moving picture in the poster page 410 and introduces it in a page 510 of the introducer. The introducer establishes an affiliate link 530 in the introducer's page 510 so as to be adjacent to a frame 520 of the commodity explanation moving picture or so as to be superimposed on the frame 520 of the commodity explanation moving picture.

Figure 7:
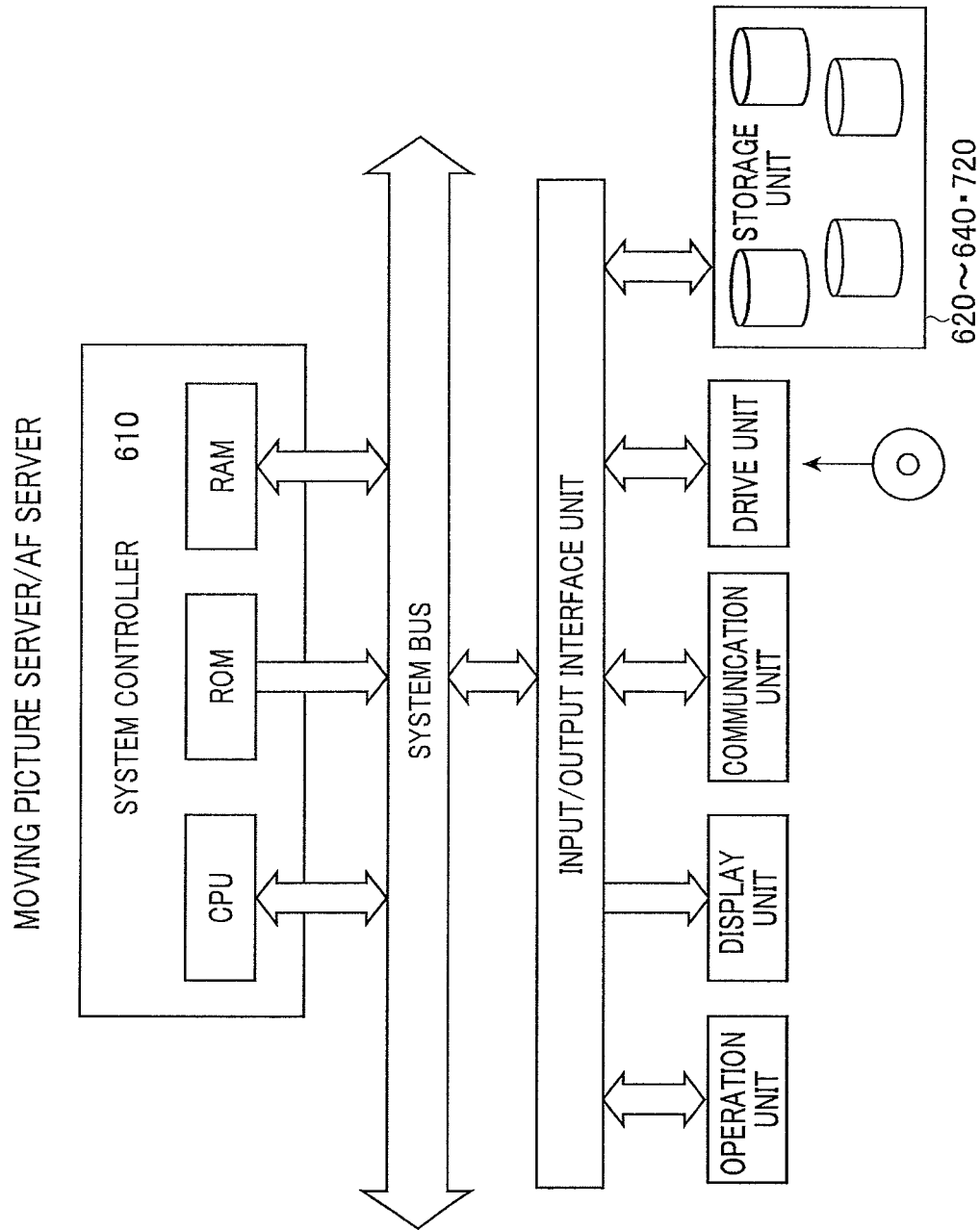
FIG. 7 is a block diagram showing an example of components of the moving picture server and the affiliate server.

FIG. 7 is a block diagram showing an example of components of the moving picture server 600 and the affiliate server 700. In FIGS. 1 and 6, the moving picture server 600 and the affiliate server 700 are written in one block and can be used as the same server using the control unit as shown in FIG. 7. On the other hand, the moving picture server 600 and the affiliate server 700 may be constructed by separate servers. Description will be given on assumption that control units 610 and 710 manage the databases.

Each of the moving picture server 600 and the affiliate server 700 has an operation unit, a display unit (for example, a CRT (Cathode Ray Tube) display, a liquid crystal display, or the like), a communication unit, a drive unit, a storage unit, an input/output interface unit, and the system control unit 610. The system control unit 610 and the input/output interface unit are connected to each other via a system bus.

The operation unit includes, for example, a keyboard and a mouse, receives an operation instruction from an operator or the like, and outputs it as an instruction signal to the system control unit 610. The display unit is, for example, a CRT (Cathode Ray Tube) display, a liquid crystal display, or the like and displays information of characters, images, and the like. The communication unit is connected to a network NW and controls a communication state with the EC server 100, the poster terminal 400, and the introducer terminal 500. The drive unit, for example, reads data or the like from a disk such as a flexible disk, a CD (Compact Disc) or a DVD (Digital Versatile Disc), and records data on the disk. The storage unit is, for example, a hard disk drive or the like, stores various programs, data, and the like. The storage unit is an example of the image data storing means. The input/output interface unit performs a process of interface between the operation unit, the display unit, the communication unit, the drive unit, and the storage unit and the system control unit 610. The system control unit 610 includes a CPU (Central Processing Unit), a ROM (Read Only Memory), and a RAM (Random Access Memory).

In the storage unit, a moving picture database 620, a poster database 630, an introducer database 640, and an affiliate database 720 are created.

Figure 8:
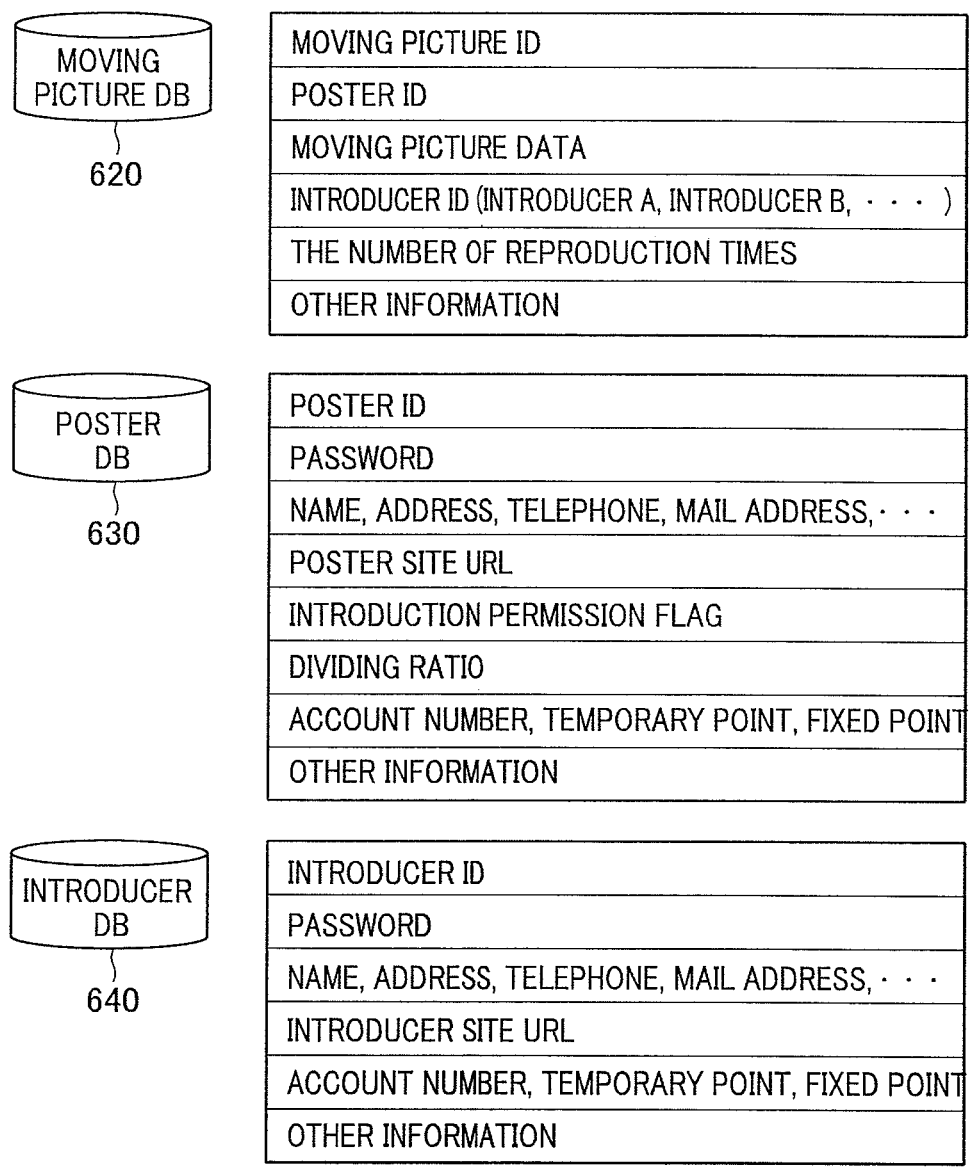
FIG. 8 is a diagram showing an example of the details of information registered in a moving picture database, a poster database, and an introducer database.
Figure 9:
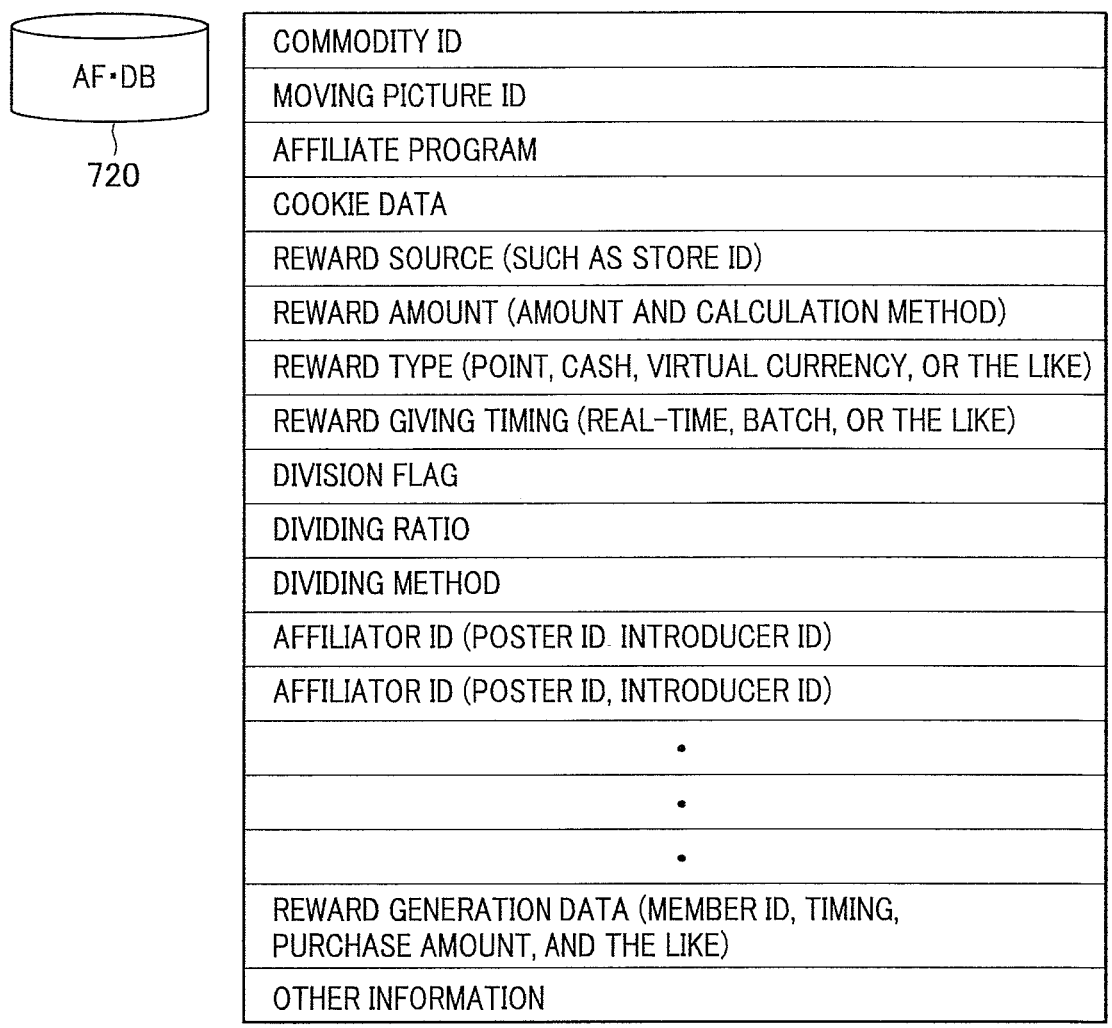
FIG. 9 is a diagram showing an example of information registered in an affiliate database.

FIGS. 8 and 9 are diagrams showing an example of the details of information registered in the databases in the storage unit.

In the moving picture database 620, data of commodity detailed information created by the poster is stored. The data is information of the commodity explanation text and the commodity explanation moving picture. Information of a distribution destination of the moving picture is also stored in association with the moving picture ID. There are a case where the terminal of the poster himself/herself is a distribution destination and a case where the introducer terminal is a distribution destination. Consequently, information used as the distribution destination information is the poster ID and the introducer ID.

In the poster database 630, personal information on the poster is stored in association with the poster ID. In the poster database 630, poster page URL as a moving picture distribution destination and an introduction permission flag are stored. The introduction permission flag is, for example, information indicative of whether distribution of a moving picture to an introducer is permitted. When the flag is set, a moving picture created by the poster is distributed to the introducer. Further, in the poster database 630, a division ratio is stored.

In the introducer database 640, personal information on the poster is stored in association with the introducer ID. In the introducer database 640, introducer page URL as the moving picture distribution destination is stored.

As shown in FIG. 9, in the affiliate database 720, an affiliate program provided to the poster terminal 400 or the introducer terminal 500 and cookie data stored in the user terminals 310 and 320 are stored.

The affiliate program is pasted to the poster page 410 as a button icon in accordance with an operation on the poster terminal 400 of the poster. The affiliate program is also pasted to the introducer page 510 as a button icon in accordance with an operation on the introducer terminal 500 of the introducer.

Cookie data is data generated by the browsers of the user terminals 310 and 320 when the user operate the user terminals 310 and 320 to click the button icon of the poster page 410 or the button icon of the introducer page 510.

In the affiliate database 720, a reward type, a reward providing timing, and the like are stored in association with a moving picture ID. The reward type is data indicative of the type of value as an exchange value such as point, cash, virtual currency, or the like, and the reward providing timing is data indicative of a type of timing such as real-time, a timing of batch process, or the like.

Further, in the affiliate database 720, a division flag, a division ratio, and a dividing method are stored. The division flag denotes data indicative of whether a reward which occurs in the EC server is to be divided. The division ratio is, concretely, a ratio of dividing a reward between a poster and an introducer. The dividing ratio between the poster and the introducer is, for example, "0.50:0.50" or "0.80:0.20". The dividing ratio is interlocked with the dividing ratio in the poster database 630. In the dividing method, when a reward occurs, all of the reward is given to either the poster or the introducer.

When attention is paid to a generation timing, the dividing method includes, for example, (1) a method of dividing a reward with reference to the dividing ratio when reward giving data is received from the EC server 100, and (2) a method of dividing a reward with reference to a cookie which is generated in a user terminal by writing the poster ID or introducer ID in cookie data.

When attention is paid to a process timing, the dividing method includes, for example, (A) a method of alternately giving a full amount of a reward to the poster and the introducer when the dividing ratio between the poster and the introducer is 0.50:0.50, (B) a method, in the case where the dividing ratio between the poster and the introducer is 0.50:0.50, of adding a full amount of a reward to either the poster database or the introducer database a predetermined number of times, for example, (N/2) times in a row and adding a full amount of a reward to the other database the predetermined number of times, for example, (N/2) times in a row (N is an even number), (C) a method of alternately writing the poster ID and the introducer ID in a cookie in the case where the dividing ratio between the poster and the introducer is 0.50:0.50, (D) a method, in the case where the dividing ratio between the poster and the introducer is 0.50:0.50, of writing either the poster ID or the introducer ID to a user who clicked an affiliate button a predetermined number of times, for example, (N/2) times in a row and writing the other ID the predetermined number of times, for example, (N/2) times in a row (N is an even number), (E) a method, in the case where the dividing ratio between the poster and the introducer is 0.80 (N):0.20 (M), of adding a full amount of a reward to either the poster database or the introducer database at a ratio of (N/(N+M)) in a row and adding a full amount of the reward to the other database at a ratio of (M/(N+M)) in a row, and (F) a method, in the case where the dividing ratio between the poster and the introducer is 0.80 (N): 0.20 (M), of writing either the poster ID or the introducer ID to a user who clicked an affiliate button at a ratio of (N/(N+M)) in a row and writing the other ID at a ratio of (M/(N+M)) in a row.

A record of the affiliator ID is associated with a moving picture ID, and a poster and an introducer to which a reward is to be given are stored. In the affiliate database 720, reward occurrence data and the like is also stored.

Figure 10:
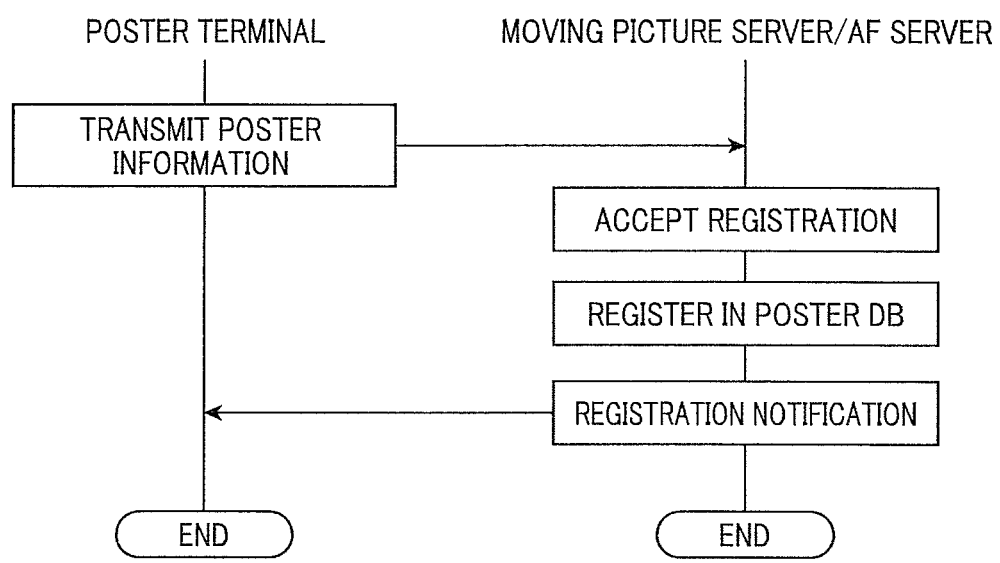
FIG. 10 is a diagram showing a flow of process on poster information registered in the poster database.

FIG. 10 is a diagram showing a flow of process on poster information registered in the poster database 630. The poster operates the poster terminal 400 to access the moving picture server 600 and enter registration information such as name. The moving picture server 600 receives the registration information and registers it into the poster database 630. The moving picture server 600 transmits a registration notification to the poster terminal 400.

Figure 11:
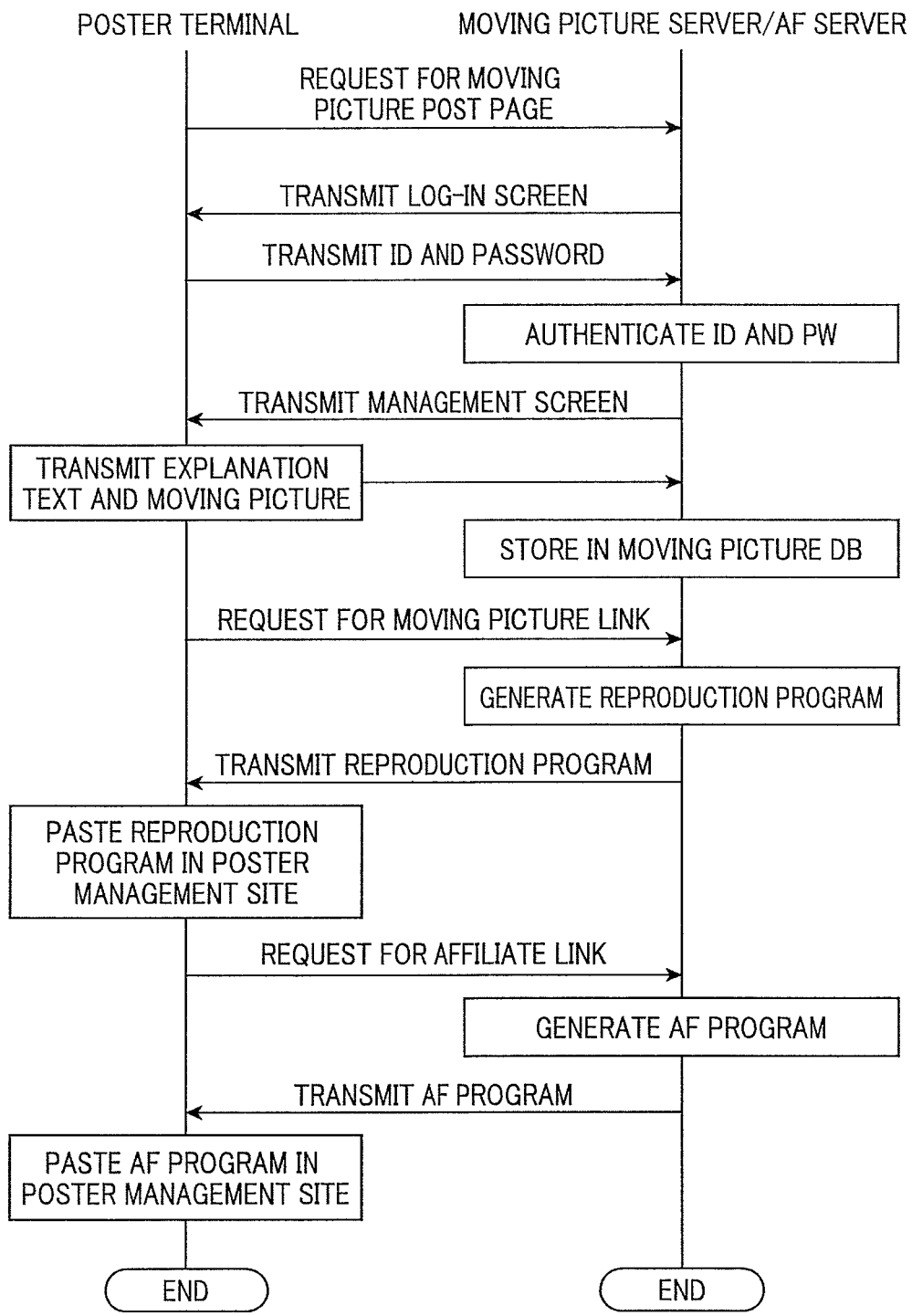
FIG. 11 is a diagram showing a flow of process on moving picture data registered in the moving picture database, and a flow of process on a moving picture link and an affiliate link generated in a poster's page.

FIG. 11 is a diagram showing a flow of process on moving picture data registered in the moving picture database 620, and a flow of process on a moving picture link and an affiliate link generated in a poster's page.

When the poster operates the poster terminal 400 and accesses the moving picture server 600, the moving picture server 600 transmits an authentication page, receives predetermined information such as ID, performs authenticating process, and transmits a management screen for moving picture posting. The poster operates the poster terminal 400 to enter commodity explanation text and a commodity explanation moving picture to a management screen. The moving picture server 600 receives the commodity explanation text and the commodity explanation moving picture from the poster terminal 400 and stores them in the moving picture database 620.

In the case of reproducing the moving picture on the poster page of the poster, the poster requests the moving picture server 600 for a reproduction program as a moving picture link. In response to the request, the moving picture server 600 generates a reproduction program and transmits it to the poster terminal 400. The poster pastes the moving picture link in the poster page. When the user visiting the poster page operates the reproduction program as the moving picture link, the commodity explanation moving picture is reproduced in the moving picture frame 420. The commodity explanation text may be created in the poster page by the poster himself/herself or may be received together with moving picture data from the moving picture server 600 and displays it on the page.

In the case of pasting an affiliate link in the poster page of the poster, the poster requests the affiliate server 700 for an affiliate program as an affiliate link. In response to the request, the affiliate server 700 generates an affiliate program and transmits it to the poster terminal 400. The poster pastes the affiliate link on the poster page. When the user visiting the poster page visits the net shopping site S via the affiliate link, the affiliate program generates a cookie in the browser of the user. After that, when the user purchases a commodity in the net shopping site S, a reward is generated for the poster.

Figure 12:
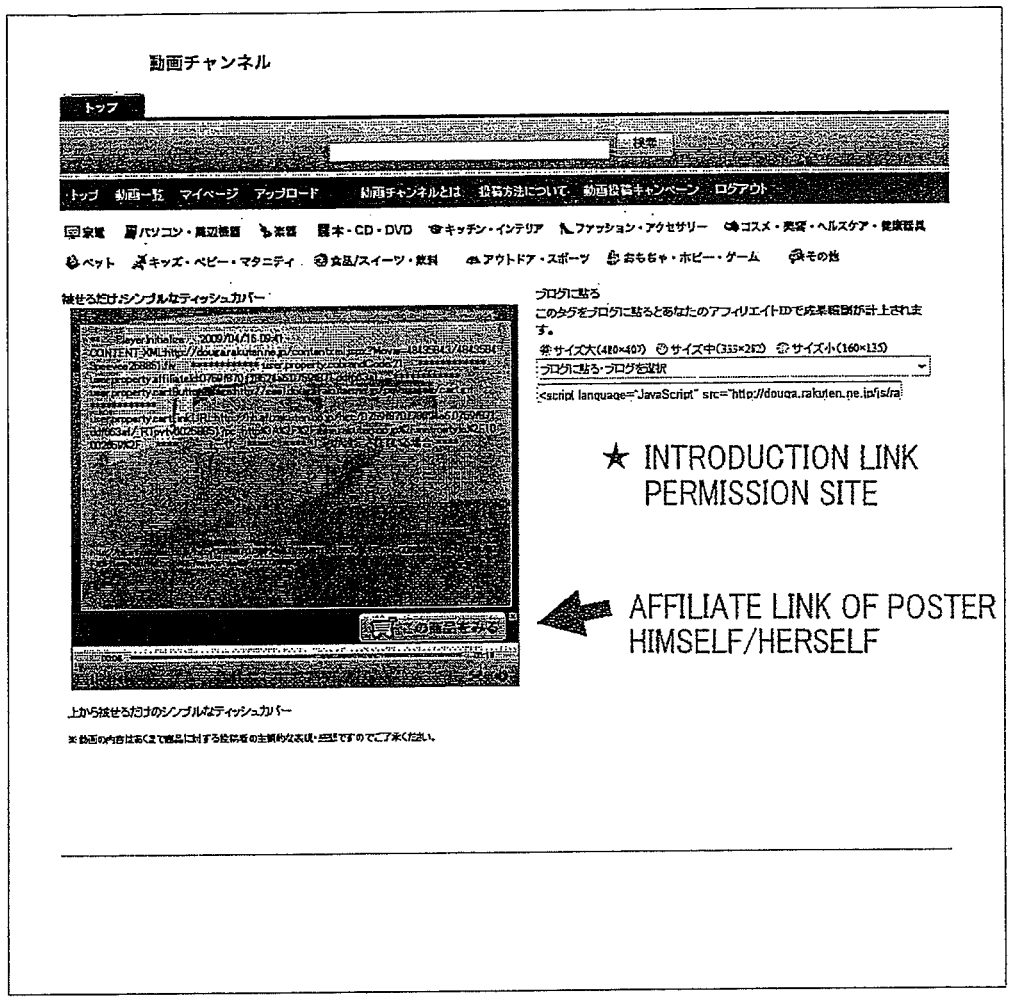
FIG. 12 is a diagram showing a display example of a poster's page.

FIG. 12 is a diagram showing a display example of the poster page 410. In the case where the poster operates the poster terminal and generates the moving picture link and the affiliate link, the moving picture link is generated together with a moving picture operation button in the poster page. The affiliate link is generated so as to be superimposed in the moving picture frame. The poster page 410 includes a statement of permitting introduction in response to the introduction permission flag in the poster database 630.

Figure 13:
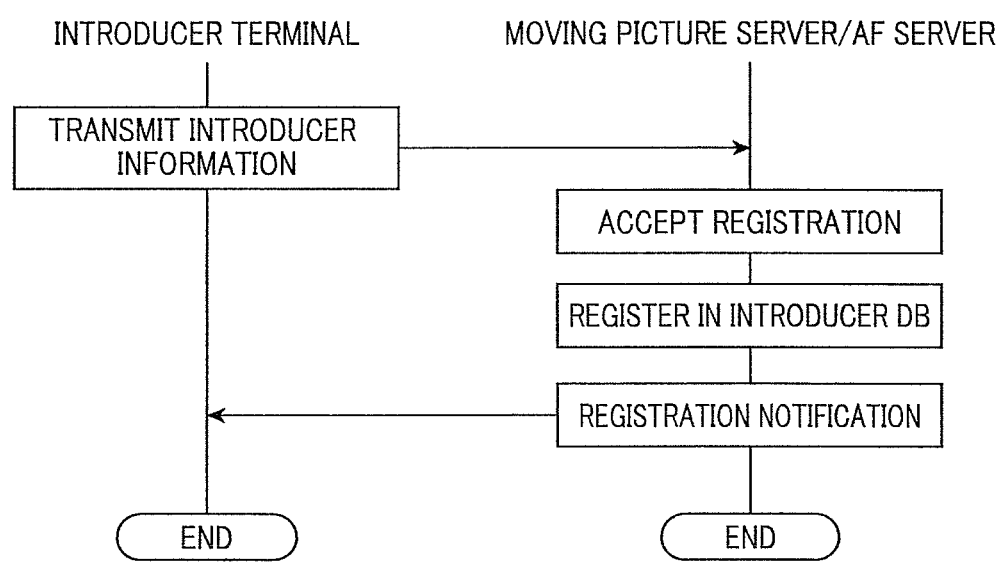
FIG. 13 is a diagram showing a flow of process on introducer information registered in the introducer database.

FIG. 13 is a diagram showing a flow of process on introducer information registered in the introducer database 640. The introducer operates the introducer terminal 500 to access the moving picture server 600 and enter registration information of name and the like. The moving picture server 600 receives the registration information and registers it in the introducer database 640. The moving picture server 600 transmits a registration notification to the introducer terminal 500.

Figure 14:
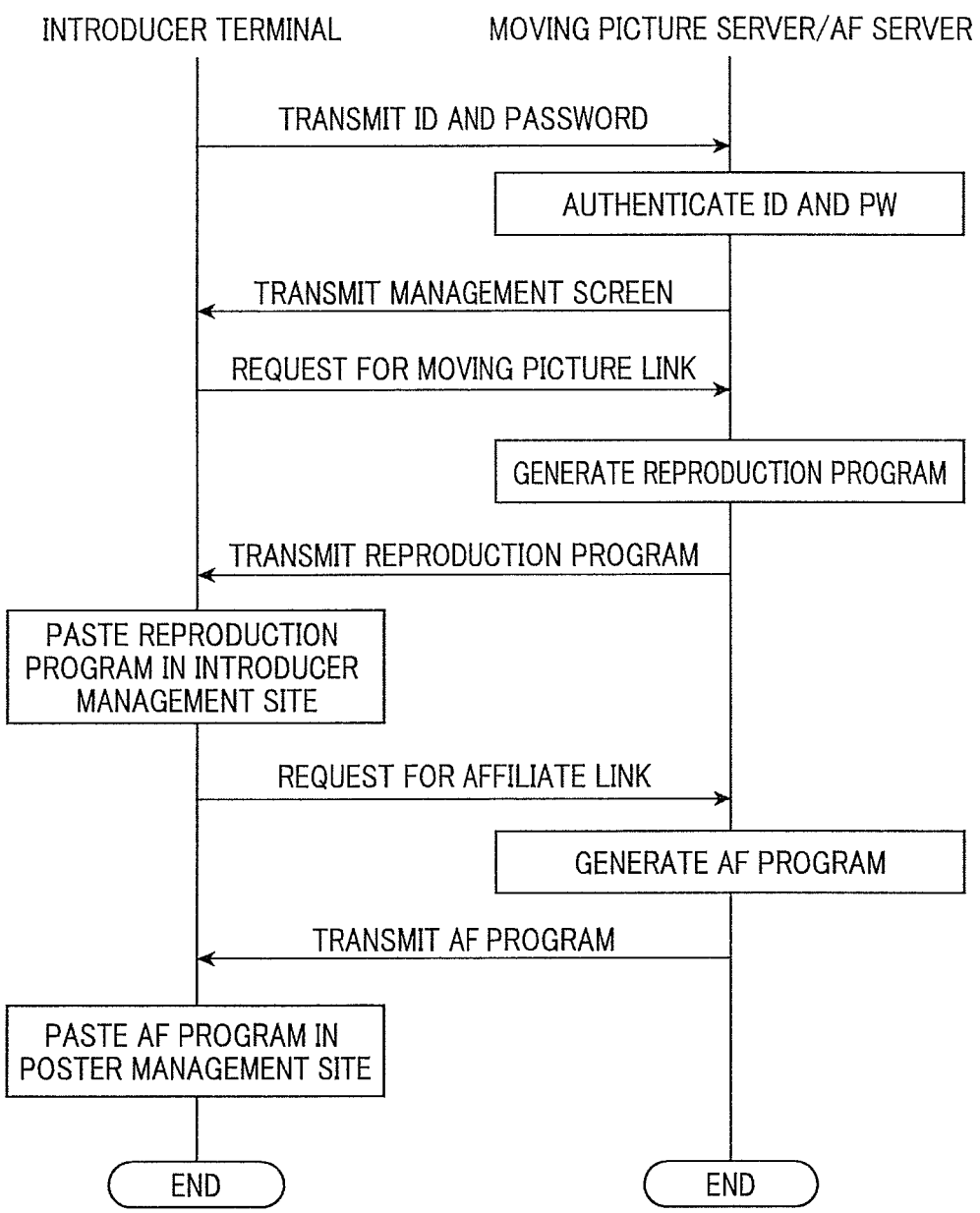
FIG. 14 is a diagram showing a flow of process on the moving picture link and the affiliate link generated in an introducer's page.

FIG. 14 is a diagram showing a flow of process on the moving picture link and the affiliate link generated in the introducer's page. It is assumed that the introducer views the commodity explanation moving picture in the poster page 410, recognizes the introduction link permission, and examines about setting of the link in the introduction page 510 of the introducer.

In the case of reproducing the moving picture on the introducer page of the introducer, the introducer requests the moving picture server 600 for the reproduction program as the moving picture link. In response to the request, the moving picture server 600 generates a reproduction program and transmits it to the introducer terminal 500. The introducer pastes the moving picture link on the introducer page. When the user visiting the introducer page operates the reproduction program as the moving picture link, the commodity explanation moving picture is reproduced in the moving picture frame 520. The commodity explanation text may be generated in the introducer page by the introducer himself/herself, or may be received together with the moving picture data from the moving picture server 600 and displayed on the page.

In the case of pasting an affiliate link in the introducer page of the introducer, the introducer requests the affiliate server 700 for an affiliate program as an affiliate link. In response to the request, the affiliate server 700 generates an affiliate program and transmits it to the introducer terminal 500. The introducer pastes the affiliate link on the introducer page. When the user visiting the introducer page visits the net shopping site S via the affiliate link, the affiliate program generates a cookie in the browser of the user. After that, when the user purchases a commodity in the net shopping site S, a reward is generated also for the introducer.

Figure 15:
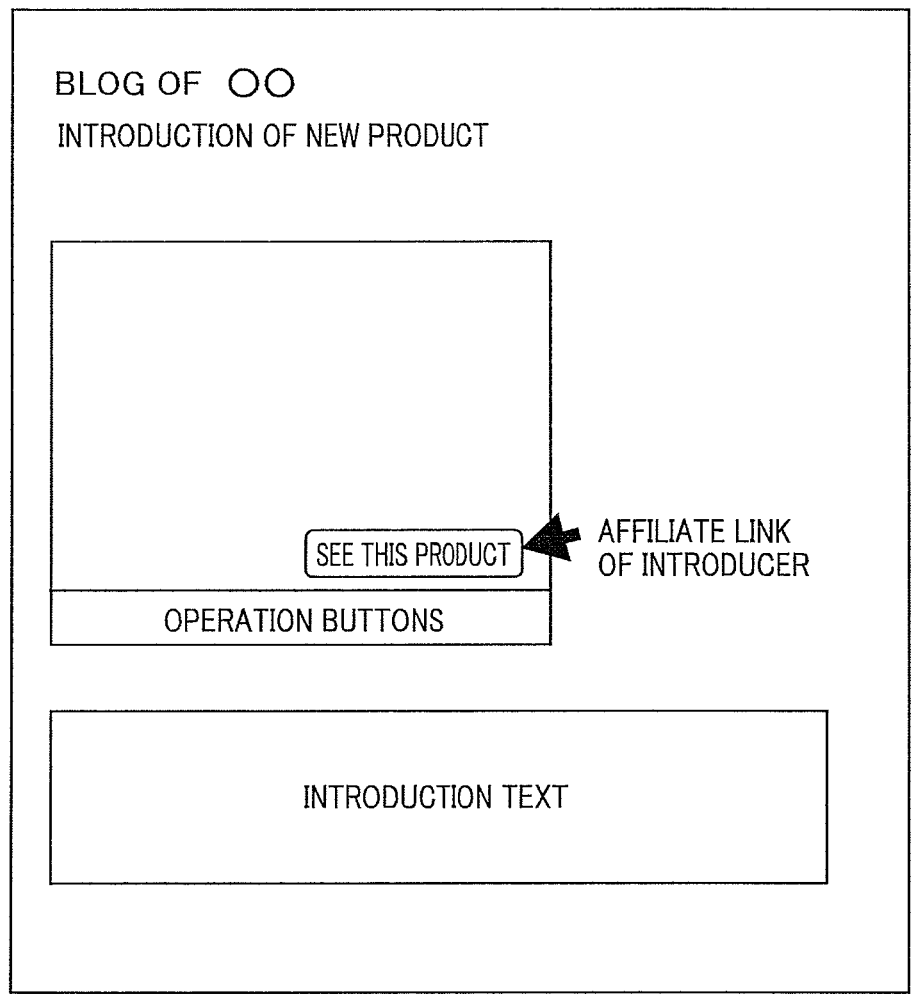
FIG. 15 is a diagram showing a display example of an introducer's page.

FIG. 15 shows a display example of the introducer's page. In the case where the introducer operates the introducer terminal and generates the moving picture link and the affiliate link, the moving picture link is generated together with a moving picture operation button in the introducer page. The affiliate link is generated so as to be superimposed in the moving picture frame.

For the introducer, only by pasting the moving picture link and the affiliate link on a blog page of the introducer, a chance to receive a reward is created. Also for the poster, a chance to receive a reward is created virally.

Figure 16:
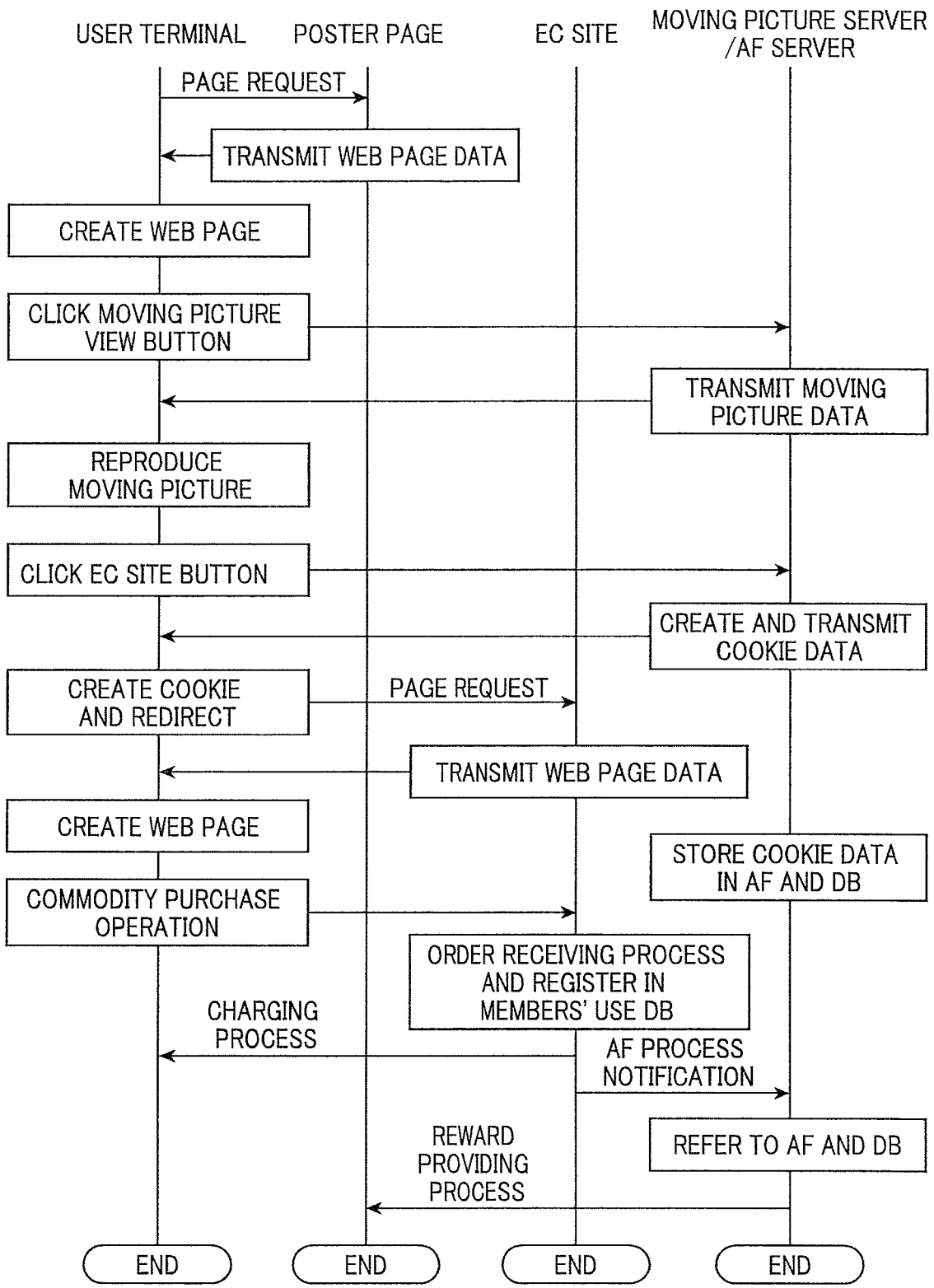
FIG. 16 is a diagram showing a process flow of providing an affiliate reward in the case where a commodity is purchased in a net shopping site S via a poster's page.

FIG. 16 is a diagram showing a process flow of providing an affiliate reward in the case where a commodity is purchased in the net shipping site S via the poster's page.

When the user operates the user terminal 310 and requests for the poster page 410, the poster page 410 is displayed on the monitor by the browser of the user terminal 310. When the user operates a moving picture viewing button with an input device of the user terminal 310, moving picture data is downloaded from the moving picture database 620 of the moving picture server 600, and the commodity explanation moving picture is reproduced in the moving picture frame.

In the affiliate program, the URL of the affiliate server, a redirect instruction to the net shopping site S, and the URL of the net shopping site S are included. When the user operates the user terminal 310 to click the affiliate button, the affiliate server 700 transmits cookie data to the user terminal 310. At this time, the browser of the user terminal 310 generates a cookie. In the cookie, commodity ID, moving picture ID, poster ID, and the like are stored together with an expiration date.

When the user operates the user terminal 310 and purchases a commodity in the net shopping site S, purchase data is stored in a member's use-history database. The EC server performs a charging process for the user, and commodity purchase data is transmitted to the affiliate server by a real-time process or a batch process.

Figure 17:
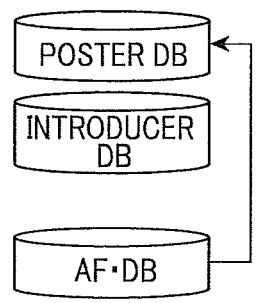
FIG. 17 is a diagram showing an example of a reward provided to a poster in the case where a commodity is purchased in the net shopping site S via a poster's page.

FIG. 17 is a diagram showing an example of a reward provided to a poster in the case where a commodity is purchased in the net shopping site S via a poster's page. When the commodity purchase data is received, the affiliate server 700 simultaneously receives the commodity ID and the poster ID, and writes a reward in the poster database with reference to the affiliate database. In the example shown in FIG. 17, only the poster receives the reward. The poster receives the reward by a real-time process or a batch process.

Figure 18:
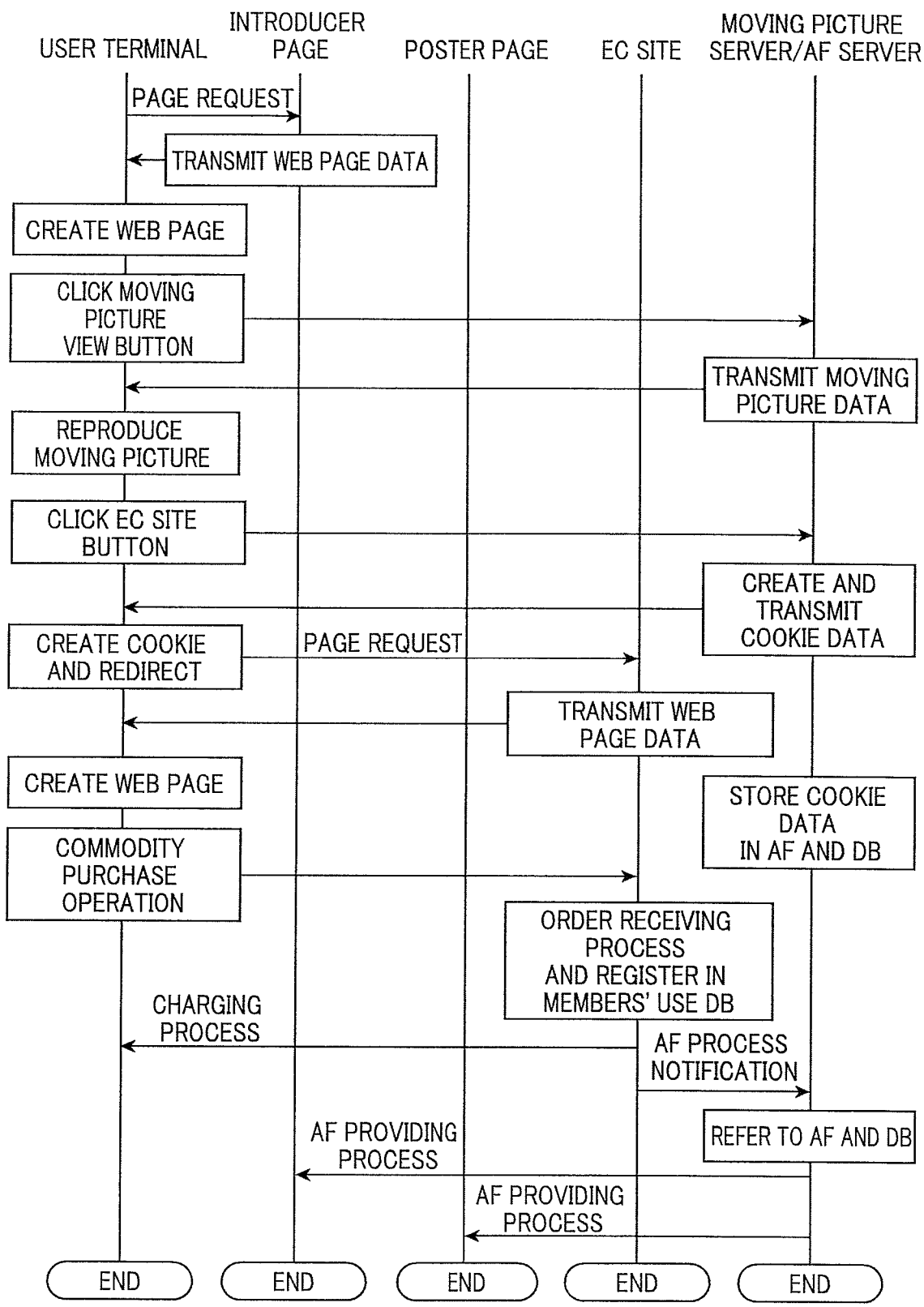
FIG. 18 is a diagram showing a process flow of providing an affiliate reward in the case where a commodity is purchased in the net shopping site S via an introducer's page.

FIG. 18 is a diagram showing a process flow of providing an affiliate reward in the case where a commodity is purchased in the net shopping site S via an introducer's page.

When the user operates the user terminal 320 to request for the introducer page 510, the introducer page 510 is displayed on the monitor by the browser of the user terminal 320. When the user operates a moving picture viewing button with an input device of the user terminal 320, moving picture data is downloaded from the moving picture database 620 of the moving picture server 600, and the commodity explanation moving picture is reproduced in the moving picture frame.

In the affiliate program, the URL of the affiliate server, a redirect instruction to the net shopping site S, and the URL of the net shopping site S are included. When the user operates the user terminal 320 to click the affiliate button, the affiliate server 700 transmits cookie data to the user terminal 320. At this time, the browser of the user terminal 320 generates a cookie. In the cookie, commodity ID, moving picture ID, poster ID, introducer ID, and the like are stored together with an expiration date.

When the user operates the user terminal 320 and purchases a commodity in the net shopping site S, purchase data is stored in a member's use-history database. The EC server performs a charging process for the user, and commodity purchase data is transmitted to the affiliate server by a real-time process or a batch process.

Figure 19:
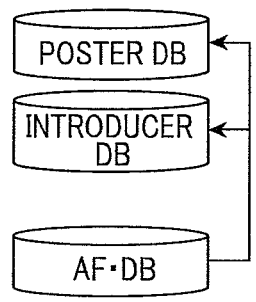
FIG. 19 is a diagram showing an example of regards provided to a poster and an introducer in the case where a commodity is purchased in the net shopping site S via the introducer's page.

FIG. 19 is a diagram showing an example of a reward provided to a poster in the case where a commodity is purchased in the net shopping site S via a poster's page. When the commodity purchase data is received, the affiliate server 700 simultaneously receives the commodity ID, the poster ID, and the introducer ID and writes a reward in the introducer database with reference to the affiliate database.

In the example shown in FIG. 19, the poster and the introducer receive the reward. Example 1 employs a method (A) of giving a full amount of the reward alternately in the case where the dividing ratio between the poster and the introducer is 0.50:0.50. The giving process may be performed at the time of writing a cookie or at the time of giving a reward. Example 2 employs a method (E), in the case where the dividing ratio between the poster and the introducer is 0.80 (N):0.20 (M), of adding a full amount of a reward to either the poster database or the introducer database at a ratio of (N/(N+M)) in a row and adding a full amount of the reward to the other database at a ratio of (M/(N+M)) in a row.

As described above, according to the present invention, it is easy to provide a moving picture to an introduction page and easy to manage a reward, so that a load on an affiliate server can be lessened. In the present invention, in addition, increase in a reward per unit period or per predetermined period can be made noticeable. Since increase in a reward becomes noticeable, the reward becomes impressing.

By using moving picture content for an affiliate program, it is expected that a chance of selling a commodity in an EC site increases dramatically, and a reward also for an affiliate site and a moving picture content producer can be also expected.

EXPLANATION OF REFERENCE CHARACTERS

100 EC server
200 store terminal opened in a net shopping site S
300 user terminal
400 poster terminal
500 introducer terminal
600 moving picture server
700 affiliate server

The invention claimed is:

1. An affiliate reward-processing server for processing an affiliate reward generated whenever a user purchases a commodity or receives a service in an Electronic commerce (EC) site via an affiliate program for guiding the user from a page that introduces the commodity or the service to the EC site which deals the commodity or the service, the affiliate reward-processing server comprising:

an affiliate database that stores the affiliate program, an amount of the affiliate reward, and a dividing ratio between a first affiliate and a second affiliate who are involved in providing the page, the dividing ratio being N:M (N and M being both positive numbers);

a communication interface configured to receive, via a network, information indicating that the user has accessed the EC site via the affiliate program;

a first database that stores a first total of affiliate rewards provided to the first affiliate;

a second database that stores a second total of affiliate rewards provided to the second affiliate; and a processor configured to access the affiliate database and execute the affiliate program to:

determine, when information indicating that the user has accessed the EC site via the affiliate program and purchased the commodity or received the service in the EC site via the affiliate program is received via the communication interface, to provide a full amount of each generated affiliate reward to the first database that stores the first total of affiliate rewards provided to the first affiliate or the second database which stores the second total of affiliate rewards provided to the second affiliate, in accordance with the dividing ratio stored in the affiliate database;

access the affiliate database, the first database, and the second database; and update, without dividing the full amount of each generated affiliate reward based on the dividing ratio, the first total of affiliate rewards stored in the first database and the second total of affiliate rewards stored in the second database, respectively, such that a ratio between the first total of affiliate rewards stored in the first database and the second total of affiliate rewards stored in the second database is the dividing ratio, wherein in a case when the dividing ratio stored in the affiliate database is set (N:M) between the first affiliate and the second affiliate and data of use is received from the EC site (N+M) number of times, the full amount of each generated affiliate reward is exclusively added to the first database N number of times, and the full amount of each generated affiliate reward is exclusively added to the second database M number of times.

2. The affiliate reward-processing server according to claim 1, wherein in a case where the dividing ratio is 1:1, the full amount of each generated affiliate reward is alternately provided to the first affiliate and to the second affiliate.

3. The affiliate reward-processing server according to claim 1, wherein in a case where the dividing ratio is 1:1, the full amount of each generated affiliate reward is provided to one of the first affiliate and the second affiliate a predetermined number of times, and then the full amount of each generated affiliate reward is provided to the other of the first affiliate and the second affiliate the predetermined number of times.

4. The affiliate reward-processing server according to claim 1, wherein the content is moving picture data and an affiliate link is displayed in a superimposed manner in a moving picture reproduction frame displayed in the terminal of the user.

5. The affiliate reward-processing server according to claim 1, wherein
a method of distributing the affiliate reward is stored in the affiliate database, and
the processor is further configured to:
determine, when the user purchases the commodity or the service in the EC site, one of the first affiliate and the second affiliate, and
provide the full amount of each generated affiliate reward to the determined one of the first affiliate and the second affiliate on a basis of the dividing ratio and the distributing method stored in the affiliate database.

6. An affiliate reward-processing method for processing an affiliate reward whenever a user purchases a commodity or receives a service in an Electronic Commerce (EC) site via an affiliate program for guiding the user from a page that introduces the commodity or the service to the EC site which deals the commodity or the service, the affiliate reward-processing method comprising:
storing, in an affiliate database, the affiliate program, an amount of the affiliate reward and a dividing ratio between a first affiliate and a second affiliate who are involved in providing the page, the dividing ratio being N:M (N and M being both positive numbers);
receiving, via a network, information indicating that the user has accessed the EC site via the affiliate program;
storing, in a first database, a first total of affiliate rewards provided to the first affiliate;
storing, in a second database, a second total of affiliate rewards provided to the second affiliate;
determining, when information indicating that the user has accessed the EC site via the affiliate program and purchased the commodity or received the service in the EC site via the affiliate program is received via the communication interface, to provide a full amount of each generated affiliate reward to the first database that stores the first total of affiliate rewards provided to the first affiliate or the second database which stores the second total of affiliate rewards provided to the second affiliate, in accordance with the dividing ratio stored in the affiliate database;
accessing the affiliate database, the first database, and the second database; and
executing the affiliate program to update, without dividing the full amount of each generated affiliate reward based on the dividing ratio, the first total of affiliate rewards stored in the first database and the second total of affiliate rewards stored in the second database, respectively, such that a ratio between the first total of affiliate rewards stored in the first database and the second total of affiliate rewards stored in the second database is the dividing ratio, wherein
in a case when the dividing ratio stored in the affiliate database is set (N:M) between the first affiliate and the second affiliate and data of use is received from the EC site (N+M) number of times, the full amount of each generated affiliate reward is exclusively added to the first database N number of times, and the full amount of each generated affiliate reward is exclusively added to the second database M number of times.

7. A non-transitory computer-readable recording medium that records a computer program for making a computer execute an affiliate reward-processing method for processing an affiliate reward whenever a user purchases a commodity or receives a service in an Electronic Commerce (EC) site via an affiliate program for guiding the user from a page that introduces the commodity or the service to the EC site which deals the commodity or the service, the affiliate reward distributing method comprising:
storing, in an affiliate database, the affiliate program, an amount of the affiliate reward and a dividing ratio between a first affiliate and a second affiliate who are involved in providing the page, the dividing ratio being N:M (N and M being both positive numbers);
receiving, via a network, information indicating that the user has accessed the EC site via the affiliate program;
storing, in a first database, a first total of affiliate rewards provided to the first affiliate;
storing, in a second database, a second total of affiliate rewards provided to the second affiliate;
determining, when information indicating that the user has accessed the EC site via the affiliate program and purchased the commodity or received the service in the EC site via the affiliate program is received via the communication interface, to provide a full amount of each generated affiliate reward to the first database that stores the first total of affiliate rewards provided to the first affiliate or the second database which stores the second total of affiliate rewards provided to the second affiliate, in accordance with the dividing ratio stored in the affiliate database;
accessing the affiliate database, the first database, and the second database; and
executing the affiliate program to update, without dividing the full amount of each generated affiliate reward based on the dividing ratio, the first total of affiliate rewards stored in the first database and the second total of affiliate rewards stored in the second database, respectively, such that a ratio between the first total of affiliate rewards stored in the first database and the second total of affiliate rewards stored in the second database is the dividing ratio, wherein
in a case when the dividing ratio stored in the affiliate database is set (N:M) between the first affiliate and the second affiliate and data of use is received from the EC site (N+M) number of times, the full amount of each generated affiliate reward is exclusively added to the first database N number of times, and the full amount of each generated affiliate reward is exclusively added to the second database M number of times.

8. An affiliate reward-processing system for processing an affiliate reward between a commodity explanation page manager and an introduction page manager who introduces a commodity explanation page, the affiliate reward-processing system comprising:

a commodity or service explanation database that receives and stores posted data of a commodity or a service from a terminal device of the explanation page manager;

a poster database that stores information of the commodity or the service explanation page manager;

an introducer database that stores the information of the introduction page manager;

an affiliate database that stores an affiliate program provided to the terminal device of the introduction page manager, an amount of the affiliate reward, a dividing ratio between the explanation page manager and the introduction page manager, and a method of distributing the affiliate reward, the dividing ratio being N:M (N and M being both positive numbers);

an affiliate tool providing apparatus that, when there is a request from the terminal device of the introduction page manager, transmits an explanation data link for providing the commodity explanation data from the commodity explanation database and an affiliate link having an affiliate program to be pasted to the introduction page, to the terminal device; and an affiliate reward server, when the user purchases the commodity or the service in an Electronic Commerce (EC) site via the affiliate link in the introduction page, refers to the affiliate database and provides, without dividing each affiliate reward based on the dividing ratio, a first total of affiliate rewards and a second total of affiliate rewards, respectively, to the explanation page manager and the introduction page manager such that a ratio between the first total of affiliate rewards provided to the explanation page manager and the second total of affiliate rewards provided to the introduction page manager is the dividing ratio, wherein in a case when the dividing ratio stored in the affiliate database is set (N:M) between the explanation page manager and the introduction page manager and data of use is received from the EC site (N+M) number of times, the full amount of each affiliate reward is exclusively added to the poster database N number of times, and the full amount of each affiliate reward is exclusively added to the introducer database M number of times.

9. The affiliate reward-processing server according to claim 1, wherein the affiliate database is comprised in the affiliate reward-processing server.

10. The affiliate reward-processing server according to claim 1, wherein each of the N times and M times correspond to a respective purchase among a plurality of distinct purchases of the commodity or the service in the EC site via the affiliate program.

11. A server for processing an affiliate reward generated whenever a user purchases a commodity or receives a service in an Electronic Commerce (EC) site via an affiliate program for guiding the user from a page that introduces the commodity or the service to the EC site which deals the commodity or the service, the server comprising:

a memory configured to store the affiliate program, an amount of the affiliate reward, and a dividing ratio between a first affiliate and a second affiliate who are involved in providing the page, the dividing ratio being N:M (N and M being both positive numbers);

a communication interface configured to receive, via a network, information indicating that the user has accessed the EC site via the affiliate program;

a first database that stores a first total of affiliate rewards provided to the first affiliate;

a second database that stores a second total of affiliate rewards provided to the second affiliate; and a processor configured to execute the affiliate program to:
determine, when information indicating that the user has accessed the EC site via the affiliate program and purchased the commodity or received the service in the EC site via the affiliate program is received via the communication interface, to provide a full amount of each generated affiliate reward to the first database that stores the first total of affiliate rewards provided to the first affiliate or the second database which stores the second total of affiliate rewards provided to the second affiliate, in accordance with the dividing ratio stored in the affiliate database;

access the memory, the first database, and the second database; and update, without dividing the full amount of each generated affiliate reward based on the dividing ratio, the first total of affiliate rewards stored in the first database and the second total of affiliate rewards stored in the second database, respectively, such that a ratio between the first total of affiliate rewards stored in the first database and the second total of affiliate rewards stored in the second database is the dividing ratio, wherein in a case when the dividing ratio stored in the affiliate database is set (N:M) between the first affiliate and the second affiliate and data of use is received from the EC site (N+M) number of times, the full amount of each generated affiliate reward is exclusively added to the first database N number of times, and the full amount of each generated affiliate reward is exclusively added to the second database M number of times.

12. The affiliate reward-processing server according to claim 11, wherein the affiliate program has a function of generating a cookie for a terminal of the user, and a type of the first database or the second database to which the affiliate reward is added is written in the cookie at the time of generating the cookie for the terminal of the user.

13. The affiliate reward-processing server according to claim 11, wherein the processor is further configured to, when executing the affiliate program, generate a cookie for a terminal of the user, and the cookie identifies one of the first database and the second database to which the affiliate reward is added.

14. The affiliate reward-processing server according to claim 1, wherein the affiliate program has a function of generating a cookie for a terminal of the user and a type of the first database or the second database to which a reward is added is written in the cookie, and in the case where the dividing ratio stored in the affiliate database is set equally between the first affiliate and the second affiliate, a type of the first database and a type of the second database are written alternately at the time of generating a cookie for the terminal of the user.

* * * * *